United States Patent
Narasimha et al.

(10) Patent No.: US 8,264,946 B2
(45) Date of Patent: Sep. 11, 2012

(54) METHODS AND SYSTEMS FOR PAPR REDUCTION IN SC-FDMA SYSTEMS

(75) Inventors: Madihally J. Narasimha, Saratogo, CA (US); Je Woo Kim, Cupertino, CA (US); Yuanning Yu, Santa Clara, CA (US); Jong Hyeon Park, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 417 days.

(21) Appl. No.: 12/425,486

(22) Filed: Apr. 17, 2009

(65) Prior Publication Data

US 2010/0165829 A1 Jul. 1, 2010

Related U.S. Application Data

(60) Provisional application No. 61/142,162, filed on Dec. 31, 2008, provisional application No. 61/155,514, filed on Feb. 25, 2009.

(51) Int. Cl.
*H04J 11/00* (2006.01)
(52) U.S. Cl. .......................... 370/208; 370/210; 370/366
(58) Field of Classification Search .................. 370/203, 370/204, 206, 208, 210, 344, 366; 375/285
See application file for complete search history.

(56) References Cited

U.S. PATENT DOCUMENTS

| 7,177,369 | B2 * | 2/2007 | Crilly, Jr. ....................... 375/296 |
| 7,372,910 | B2 * | 5/2008 | Suh et al. ....................... 375/260 |
| 7,848,438 | B2 * | 12/2010 | Baum et al. .................... 375/260 |
| 7,848,446 | B2 * | 12/2010 | Haartsen ....................... 375/285 |
| 7,961,591 | B2 * | 6/2011 | Abedi ............................ 370/208 |
| 2007/0092018 | A1 * | 4/2007 | Fonseka et al. ............... 375/265 |
| 2008/0075191 | A1 | 3/2008 | Haartsen |
| 2009/0185475 | A1 * | 7/2009 | Myung ........................ 370/210 |

FOREIGN PATENT DOCUMENTS

WO   WO2008074518   6/2008

OTHER PUBLICATIONS

Myung et al., "Peak-To-Average Power Ratio of Single Carrier FDMA Signas With Pulse Shaping"; PIMRC 2006, Dec. 11, 2006.*
International Search Report and Written Opinion—PCT/US2009/068605, International Search Authority—European Patent Office—Oct. 29, 2010.
International Preliminary Report on Patentability—PCT/US09/068605, The International Bureau of WIPO—Geneva, Switzerland, Apr. 11, 2011.

* cited by examiner

*Primary Examiner* — Dang Ton
*Assistant Examiner* — Brian O Connor
(74) *Attorney, Agent, or Firm* — Tyler Overall

(57) ABSTRACT

Certain embodiments of the present disclosure relate to methods for peak-to-average power ratio (PAPR) reduction of a transmission signal in a single carrier frequency division multiple access (SC-FDMA) system. The proposed methods and systems are based on manipulations of an SC-FDMA transmission signal in a time- and/or a frequency-domain.

52 Claims, 21 Drawing Sheets

METHODS AND SYSTEMS FOR PAPR REDUCTION IN SC-FDMA SYSTEMS

PRIORITY CLAIM

This patent application claims the benefit of priority from U.S. Provisional Patent Application Ser. No. 61/142,162, entitled "Time Domain PAPR Reduction Methods and Systems for SC-FDMA Systems" and filed Dec. 31, 2008, and from U.S. Provisional Patent Application Ser. No. 61/155,514, entitled "Methods and Systems for PAPR Reduction in SC-FMA Systems" and filed Feb. 25, 2009, both of which are assigned to the assignee of this patent application and are fully incorporated herein by reference for all purposes.

TECHNICAL FIELD

The present disclosure generally relates to wireless communications and, more particularly to methods for reducing peak-to-average power ratio (PAPR) in a single-carrier frequency division multiple access (SC-FDMA) system.

SUMMARY

Certain embodiments of the present disclosure provide a transmission method for a communication system using single carrier frequency division multiple access (SC-FDMA). The method generally includes performing a serial-to-parallel conversion of modulated symbols of data to obtain a first sequence of samples, performing a time-domain manipulation of the first sequence of samples to obtain a second sequence of samples (wherein performing the time-domain manipulation of the first sequence of samples to obtain the second sequence of samples might include performing a phase rotation on the first sequence of samples), performing a time-to-frequency transform on the second sequence of samples to obtain a third sequence of samples, performing a frequency-to-time transform on the third sequence of samples to obtain a fourth sequence of samples, where a number of samples of the fourth sequence is greater than a number of samples of the third sequence, performing a parallel-to-serial conversion of the fourth sequence of samples to obtain a fifth sequence of samples, and transmitting the fifth sequence of samples over a wireless channel.

Certain embodiments of the present disclosure provide a transmission method for a communication system using single carrier frequency division multiple access (SC-FDMA). The method generally includes performing a serial-to-parallel conversion of modulated symbols of data to obtain a first sequence of samples, performing a time-to-frequency transform on the first sequence of samples to obtain a second sequence of samples, performing a frequency-domain manipulation of the second sequence of samples to obtain a third sequence of samples, performing a frequency-to-time transform on the third sequence of samples to obtain a fourth sequence of samples, where a number of samples of the fourth sequence is greater than a number of samples of the second sequence, performing a parallel-to-serial conversion of the fourth sequence of samples to obtain a fifth sequence of samples, and transmitting the fifth sequence of samples over a wireless channel.

Certain embodiments of the present disclosure provide a transmission method for a communication system using single carrier frequency division multiple access (SC-FDMA). The method generally includes performing a serial-to-parallel conversion of modulated symbols of data to obtain a first sequence of samples, performing a time-domain manipulation of the first sequence of samples to obtain a second sequence of samples, performing a time-to-frequency transform on the second sequence of samples to obtain a third sequence of samples, performing a frequency-domain manipulation of the third sequence of samples to obtain a fourth sequence of samples, performing a frequency-to-time transform on the fourth sequence of samples to obtain a fifth sequence of samples, where a number of samples of the fifth sequence is greater than a number of samples of the third sequence, performing a parallel-to-serial conversion of the fifth sequence of samples to obtain a sixth sequence of samples, and transmitting the sixth sequence of samples over a wireless channel.

Certain embodiments of the present disclosure provide an apparatus for a communication system using single carrier frequency division multiple access (SC-FDMA). The apparatus generally includes logic for performing a serial-to-parallel conversion of modulated symbols of data to obtain a first sequence of samples, logic for performing a time-domain manipulation of the first sequence of samples to obtain a second sequence of samples (wherein the logic for performing the time-domain manipulation of the first sequence of samples to obtain the second sequence of samples might include logic for performing a phase rotation on the first sequence of samples), logic for performing a time-to-frequency transform on the second sequence of samples to obtain a third sequence of samples, logic for performing a frequency-to-time transform on the third sequence of samples to obtain a fourth sequence of samples, where a number of samples of the fourth sequence is greater than a number of samples of the third sequence, logic for performing a parallel-to-serial conversion of the fourth sequence of samples to obtain a fifth sequence of samples, and logic for transmitting the fifth sequence of samples over a wireless channel.

Certain embodiments of the present disclosure provide an apparatus for a communication system using single carrier frequency division multiple access (SC-FDMA). The apparatus generally includes logic for performing a serial-to-parallel conversion of modulated symbols of data to obtain a first sequence of samples, logic for performing a time-to-frequency transform on the first sequence of samples to obtain a second sequence of samples, logic for performing a frequency-domain manipulation of the second sequence of samples to obtain a third sequence of samples, logic for performing a frequency-to-time transform on the third sequence of samples to obtain a fourth sequence of samples, where a number of samples of the fourth sequence is greater than a number of samples of the second sequence, logic for performing a parallel-to-serial conversion of the fourth sequence of samples to obtain a fifth sequence of samples, and logic for transmitting the fifth sequence of samples over a wireless channel.

Certain embodiments of the present disclosure provide an apparatus for a communication system using single carrier frequency division multiple access (SC-FDMA). The apparatus generally includes logic for performing a serial-to-parallel conversion of modulated symbols of data to obtain a first sequence of samples, logic for performing a time-domain manipulation of the first sequence of samples to obtain a second sequence of samples, logic for performing a time-to-frequency transform on the second sequence of samples to obtain a third sequence of samples, logic for performing a frequency-domain manipulation of the third sequence of samples to obtain a fourth sequence of samples, logic for performing a frequency-to-time transform on the fourth sequence of samples to obtain a fifth sequence of samples, where a number of samples of the fifth sequence is greater than a number of samples of the third sequence, logic for performing a parallel-to-serial conversion of the fifth sequence of samples to obtain a sixth sequence of samples, and logic for transmitting the sixth sequence of samples over a wireless channel.

Certain embodiments of the present disclosure provide an apparatus for a communication system using single carrier frequency division multiple access (SC-FDMA). The apparatus generally includes means for performing a serial-to-parallel conversion of modulated symbols of data to obtain a first sequence of samples, means for performing a time-domain manipulation of the first sequence of samples to obtain a second sequence of samples (wherein the means for performing the time-domain manipulation of the first sequence of samples to obtain the second sequence of samples might include means for performing a phase rotation on the first sequence of samples), means for performing a time-to-frequency transform on the second sequence of samples to obtain a third sequence of samples, means for performing a frequency-to-time transform on the third sequence of samples to obtain a fourth sequence of samples, where a number of samples of the fourth sequence is greater than a number of samples of the third sequence, means for performing a parallel-to-serial conversion of the fourth sequence of samples to obtain a fifth sequence of samples, and means for transmitting the fifth sequence of samples over a wireless channel.

Certain embodiments of the present disclosure provide an apparatus for a communication system using single carrier frequency division multiple access (SC-FDMA). The apparatus generally includes means for performing a serial-to-parallel conversion of modulated symbols of data to obtain a first sequence of samples, means for performing a time-to-frequency transform on the first sequence of samples to obtain a second sequence of samples, means for performing a frequency-domain manipulation of the second sequence of samples to obtain a third sequence of samples, means for performing a frequency-to-time transform on the third sequence of samples to obtain a fourth sequence of samples, where a number of samples of the fourth sequence is greater than a number of samples of the second sequence, means for performing a parallel-to-serial conversion of the fourth sequence of samples to obtain a fifth sequence of samples, and means for transmitting the fifth sequence of samples over a wireless channel.

Certain embodiments of the present disclosure provide an apparatus for a communication system using single carrier frequency division multiple access (SC-FDMA). The apparatus generally includes means for performing a serial-to-parallel conversion of modulated symbols of data to obtain a first sequence of samples, means for performing a time-domain manipulation of the first sequence of samples to obtain a second sequence of samples, means for performing a time-to-frequency transform on the second sequence of samples to obtain a third sequence of samples, means for performing a frequency-domain manipulation of the third sequence of samples to obtain a fourth sequence of samples, means for performing a frequency-to-time transform on the fourth sequence of samples to obtain a fifth sequence of samples, where a number of samples of the fifth sequence is greater than a number of samples of the third sequence, means for performing a parallel-to-serial conversion of the fifth sequence of samples to obtain a sixth sequence of samples, and means for transmitting the sixth sequence of samples over a wireless channel.

Certain embodiments of the present disclosure provide a computer-program product for a communication system using single carrier frequency division multiple access (SC-FDMA), comprising a computer-readable medium having instructions stored thereon, the instructions being executable by one or more processors. The instructions generally include instructions for performing a serial-to-parallel conversion of modulated symbols of data to obtain a first sequence of samples, instructions for performing a time-domain manipulation of the first sequence of samples to obtain a second sequence of samples (wherein the instructions for performing the time-domain manipulation of the first sequence of samples to obtain the second sequence of samples might include instructions for performing a phase rotation on the first sequence of samples), instructions for performing a time-to-frequency transform on the second sequence of samples to obtain a third sequence of samples, instructions for performing a frequency-to-time transform on the third sequence of samples to obtain a fourth sequence of samples, where a number of samples of the fourth sequence is greater than a number of samples of the third sequence, instructions for performing a parallel-to-serial conversion of the fourth sequence of samples to obtain a fifth sequence of samples, and instructions for transmitting the fifth sequence of samples over a wireless channel.

Certain embodiments of the present disclosure provide a computer-program product for a communication system using single carrier frequency division multiple access (SC-FDMA), comprising a computer-readable medium having instructions stored thereon, the instructions being executable by one or more processors. The instructions generally include instructions for performing a serial-to-parallel conversion of modulated symbols of data to obtain a first sequence of samples, instructions for performing a time-to-frequency transform on the first sequence of samples to obtain a second sequence of samples, instructions for performing a frequency-domain manipulation of the second sequence of samples to obtain a third sequence of samples, instructions for performing a frequency-to-time transform on the third sequence of samples to obtain a fourth sequence of samples, where a number of samples of the fourth sequence is greater than a number of samples of the second sequence, instructions for performing a parallel-to-serial conversion of the fourth sequence of samples to obtain a fifth sequence of samples, and instructions for transmitting the fifth sequence of samples over a wireless channel.

Certain embodiments of the present disclosure provide a computer-program product for a communication system using single carrier frequency division multiple access (SC-FDMA), comprising a computer-readable medium having instructions stored thereon, the instructions being executable by one or more processors. The instructions generally include instructions for performing a serial-to-parallel conversion of modulated symbols of data to obtain a first sequence of samples, instructions for performing a time-domain manipulation of the first sequence of samples to obtain a second sequence of samples, instructions for performing a time-to-frequency transform on the second sequence of samples to obtain a third sequence of samples, instructions for performing a frequency-domain manipulation of the third sequence of samples to obtain a fourth sequence of samples, instructions for performing a frequency-to-time transform on the fourth sequence of samples to obtain a fifth sequence of samples, where a number of samples of the fifth sequence is greater than a number of samples of the third sequence, instructions for performing a parallel-to-serial conversion of the fifth sequence of samples to obtain a sixth sequence of samples, and instructions for transmitting the sixth sequence of samples over a wireless channel.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Orthogonal frequency division multiplexing (OFDM) is a multi-carrier scheme that partitions a frequency band (e.g., the system-bandwidth) into multiple orthogonal sub-bands. These sub-bands are also called tones, subcarriers and bins.

By applying the OFDM scheme, each sub-band can be associated with a respective subcarrier that may be independently modulated with data.

The OFDM scheme has certain desirable characteristics such as high spectral efficiency and robustness against multipath effects. However, a major drawback of the OFDM scheme is a high peak-to-average power ratio (PAPR), which means that the ratio of the peak power to the average power of an OFDM waveform can be high. The high PAPR of the OFDM waveform results from the in-phase addition of all subcarriers when they are independently modulated with data. In fact, it can be shown that the peak power of the OFDM waveform can be up to N times greater than the average power, where N is the number of orthogonal sub-bands.

The high PAPR of the OFDM signal may degrade performance. For example, large peaks in the OFDM waveform may cause a power amplifier at the transmitter to operate in a highly non-linear region or possibly to clip, which would then cause intermodulation, distortion and other artifacts that can degrade signal quality. The degraded signal quality may adversely affect accuracy of channel estimation, data detection, and channel decoding.

PAPR can be reduced by employing a Single Carrier Frequency Division Multiple Access (SC-FDMA) transmission, also known as a Discrete Fourier Transform (DFT) spread OFDM, as it is implemented in emerging Long Term Evolution (LTE) wireless systems. However, it may be possible to further reduce the PAPR by implementing various time- and/or frequency-domain manipulations of the component signals. This may yield even higher efficiency of the power amplifier, which may also improve a battery life of the transmitter.

Exemplary Wireless Communication System

Figure 1:
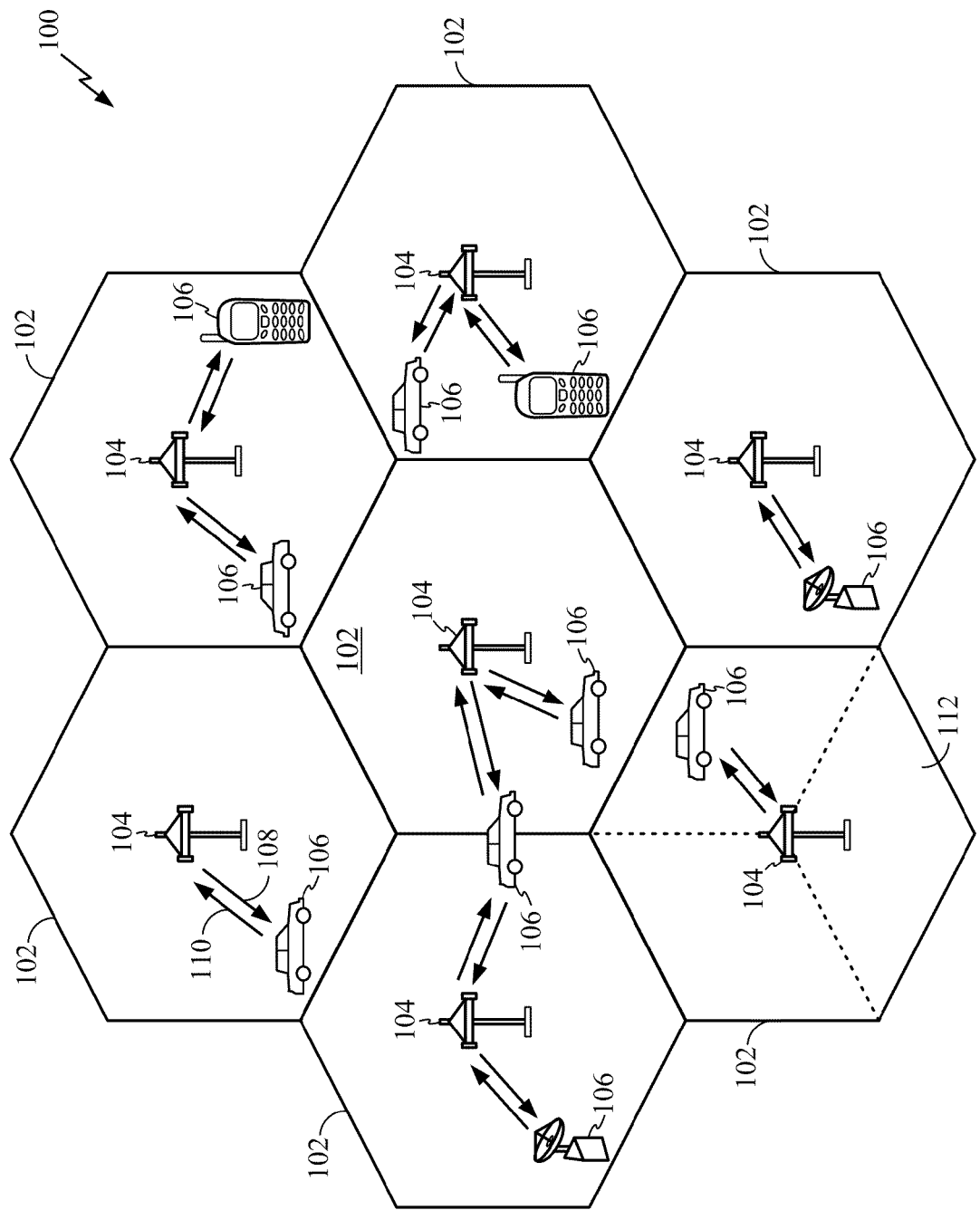
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with single-carrier frequency division multiple access (SC-FDMA) technique. If this is the case, the wireless communication system 100 may be referred to as an SC-FDMA system.

A communication link that facilitates transmission from a base station 104 to a user terminal 106 may be referred to as a downlink (DL) 108, and a communication link that facilitates transmission from a user terminal 106 to a base station 104 may be referred to as an uplink (UL) 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

System 100 may utilize single-carrier frequency division multiple access (SC-FDMA), orthogonal frequency division multiple access (OFDMA), and/or some other multiplexing scheme. SC-FDMA includes interleaved FDMA (IFDMA) which transmits data on subbands that are distributed across a frequency band, localized FDMA (LFDMA) which transmits data on a group of adjacent subbands, and enhanced FDMA (EFDMA) which transmits data on multiple groups of adjacent subbands. IFDMA is also called distributed FDMA, and LFDMA is also called narrowband FDMA, classical FDMA, and FDMA. OFDMA utilizes OFDM. Modulation symbols are sent in the time domain with IFDMA, LFDMA and EFDMA and in the frequency domain with OFDM. In general, system 100 may utilize one or more multiplexing schemes for the forward and reverse links. For example, system 100 may utilize (1) SC-FDMA (e.g., IFDMA, LFDMA or EFDMA) for both the forward and reverse links (2) one version of SC-FDMA (e.g., EFDMA) for one link and another version of SC-FDMA (e.g., IFDMA) for the other link, (3) SC-FDMA for the reverse link and OFDMA for the forward link, or (4) some other combination of multiplexing schemes. SC-FDMA, OFDMA, and/or some other multiplexing scheme, or a combination thereof may be used for each link to achieve the desired performance. For example, SC-FDMA and OFDMA may be used for a given link, with SC-FDMA being used for some subbands and OFDMA being used on other subbands. It may be desirable to use SC-FDMA on the reverse link to achieve lower PAPR and to relax the power amplifier requirements for the terminals. It may be desirable to use OFDMA on the forward link to potentially achieve higher system capacity.

Figure 2:
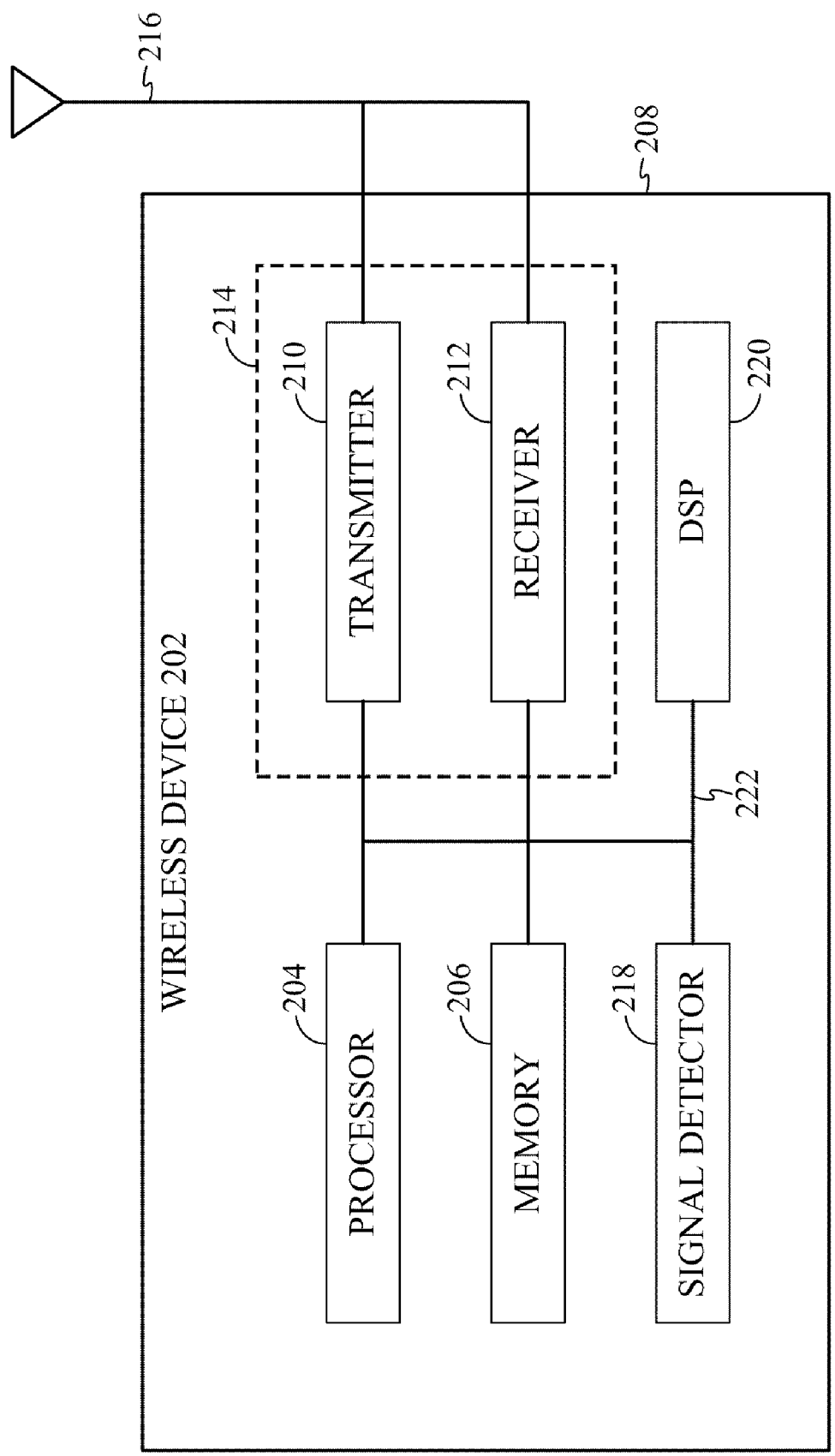
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

In a generic OFDM transmitter, the input data X[k], k=0, 1, ..., N−1, are transmitted within a single OFDM symbol period. After the serial/parallel transformation, N-point inverse discrete Fourier transform (N-IDFT), and parallel/serial transformation, the input data are transformed into the following discrete time sequence:

$$x[n] = \frac{1}{\sqrt{N}} \sum_{k=0}^{N-1} X[k] \cdot W_N^{kn}, n = 0, 1, \ldots, N-1, \quad (1)$$

where $W_N = e^{j2\pi/N}$ is the rotation factor.

The discrete time sequence x[n] obtained from equation (1) may undergo the cyclic prefix insertion and digital-to-analog transformation to obtain an analog signal x(t). The analog signal is then transmitted to a radio frequency (RF) front end for further processing, including an IQ modulation, an up conversion, and power amplification. The PAPR of the analog signal x(t) can be defined as (in dB units):

$$PAPR = 10\log_{10} \frac{\max_{0 \le t \le NT} |x(t)|^2}{\frac{1}{NT} \int_0^{NT} |x(t)|^2 \, dt} \text{(dB)}, \quad (2)$$

where T is a time duration of sample X[k], N·T is a time duration of an OFDM block, and $$\frac{1}{NT}$$

represents frequency spacing between adjacent subcarriers.

The PAPR of the analog signal x(t) is typically several dB units higher than the PAPR of the corresponding discrete time sequence x[n], and is close to the PAPR of x[n/L], where x[n/L] represents the sequence obtained by L times oversampling of x[n]. Therefore, the PAPR of analog signal x(t) can be approximated by using discrete time sequence x[n/L] as follows:

$$PAPR = 10\log_{10} \frac{\max_{0 \le n \le LN-1} |x[n/L]|^2}{E\{|x[n/L]|^2\}} \text{(dB)}, \quad (3)$$

where E(.) is the expectation operation. The approximation given by equation (3) is sufficiently accurate if L≧4.

One of the main disadvantages of OFDM systems is a high PAPR of the modulated signal. When the modulated signal with the high PAPR passes through the RF front end, the signal may be distorted due to the non-linearity of an RF power amplifier. The non-linearity of the power amplifier not only causes the in-band signal distortion which leads to the increase of the bit error rate (BER), but may also cause the out-of-band radiation which leads to the interference of adjacent channels. A straightforward solution to this problem would be to utilize an RF amplifier with a larger linear region. However, this leads to a reduction of power efficiency, higher power consumption and higher manufacturing cost.

In order to decrease the PAPR, various methods can be employed, such as variants of OFDM like SC-FDMA, offset DFT-S-OFDM (DFT-spread OFDM) and precoded DFT-S-OFDM. In these methods of modifying OFDM signal generation, PAPR characteristics of the transmitted signal can be improved by spreading the transmission data vector by a fast Fourier transform (FFT) before mapping data to subcarriers in frequency domain. In particular, since the data signal mapped by the subcarriers is performed by an inverse fast Fourier transform (IFFT) at a final transmission step, the contribution of signals having peak powers may be cancelled out to reduce a power variation of the final transmission signal.

Figure 3:
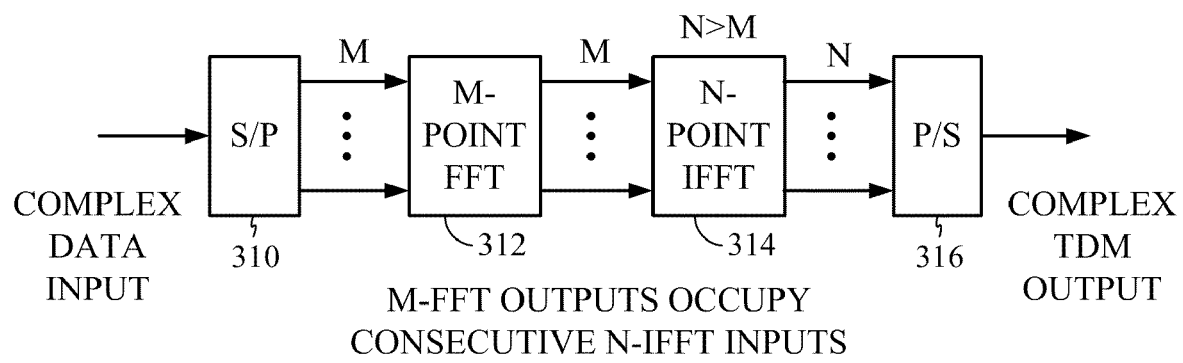
FIG. 3 illustrates a single-carrier frequency division multiple access (SC-FDMA) transmission in accordance with certain embodiments of the present disclosure.

FIG. 3 illustrates a generic SC-FDMA transmission. Time-domain complex input data may be first converted from a serial stream to a parallel stream in blocks of M symbols by a serial-to-parallel (S/P) converter 310, and then transformed to a frequency domain by the M-point FFT unit 312. The output of the M-point FFT may be transformed back to a time domain by the N-point IFFT unit 314. It should be noted that the size of IFFT is typically greater than the size of FFT (i.e., N>M).

After shifting the low-frequency component to the center of the spectrum, the outputs of the M-point FFT unit 312 may be connected to M contiguous inputs of the N-point IFFT unit 314, while the remaining (N−M) inputs may be set to zero. The N parallel outputs of the N-point IFFT unit 314 may be converted to a serial stream by a parallel-to-serial (P/S) converter 316 yielding a complex baseband signal to which a cyclic prefix (CP) may be appended, and then translated to a radio frequency (RF) band for transmission. A frequency multiplexing of different users may be accomplished by directing the corresponding outputs of the M-point FFT unit 312 to disjoint (contiguous) inputs of the N-point IFFT unit 314.

It is well-known in the art that the SC-FDMA system illustrated in FIG. 3 can provide improved PAPR compared to traditional OFDM systems such as the Worldwide Interoperability for Microwave Access (WiMAX) system. However, it is possible to further improve the PAPR by adequately processing data samples in time- and/or frequency-domain. The present disclosure proposes such techniques.

Figure 4:
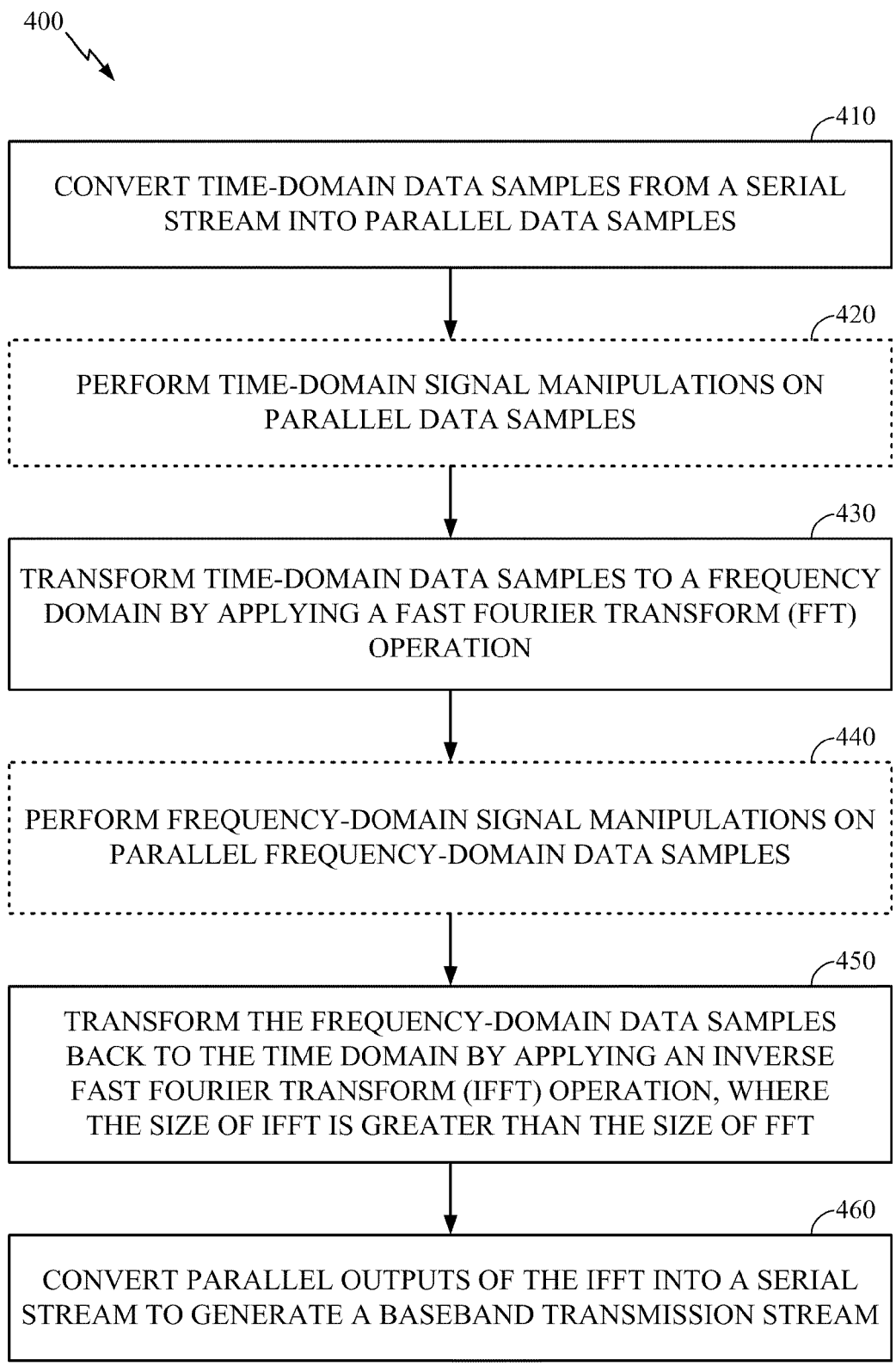
FIG. 4 illustrates example operations for reducing a peak-to-average power ratio (PAPR) of a transmission signal by applying time- and/or frequency-domain signal manipulations at a Single-Carrier Frequency Division Multiple Access (SC-FDMA) transmitter in accordance with certain embodiments of the present disclosure.

FIG. 4 summarizes example operations 400 for reducing the PAPR of a transmission signal by applying time- and/or frequency-domain signal manipulations at the SC-FDMA transmitter in accordance with certain embodiments of the present disclosure. At 410, time-domain data samples may be converted from a serial stream into parallel data samples. At 420, time-domain signal manipulations may be performed on parallel data samples to reduce the level of PAPR of the transmission signal. Following that, at 430, manipulated time-domain data samples may be transformed to a frequency domain by applying the FFT operation.

At 440, manipulations of the frequency-domain signal may be performed on parallel frequency-domain data samples for the purpose of reducing the level of PAPR. At 450, the frequency-domain data samples may be transformed back to the time domain by applying the IFFT operation, wherein the size of IFFT may be greater than the size of FFT. Finally, at 460, parallel outputs of the IFFT may be converted into a serial stream in order to generate a baseband transmission stream.

Exemplary Time Domain PAPR Reduction

Figure 5:
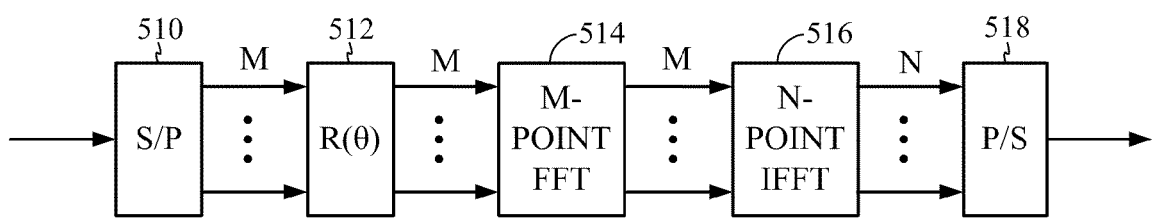
FIG. 5 illustrates an example block diagram of the SC-FDMA transmitter with a PAPR reduction scheme based on a phase rotation of time-domain signal in accordance with certain embodiments of the present disclosure.

For one embodiment of the present disclosure, the PAPR may be reduced by applying a phase rotation on the time-domain data samples before applying the FFT operation. FIG. 5 illustrates an example block diagram of a SC-FDMA transmitter with a PAPR reduction scheme based on a phase rotation of time-domain signal. Time-domain input data samples may be first converted from a serial stream to parallel data streams in blocks of M symbols by a serial-to-parallel (S/P) converter 510. After that, the M parallel outputs from the S/P converter may be multiplied in unit 512 by an M×M complex rotation matrix denoted as $R(\theta)$ before applying the M-point FFT operation by unit 514. The output of the M-point FFT may be transformed back to a time domain by the N-point IFFT unit 516. It should be noted that the size of IFFT may be greater than the size of FFT (i.e., N>M). The N parallel outputs of the N-point IFFT unit 516 may be converted to a serial stream by a parallel-to-serial (P/S) converter 518 yielding a complex baseband signal to which the CP may be appended, and then translated to the RF band for transmission.

Although the proposed technique may be applicable to all modulation schemes, the achievable PAPR reduction may be the largest for Binary Phase Shift Keying (BPSK) modulated signals. The complex rotation matrix $R(\theta)$ may be an M×M diagonal matrix whose non-zero entries are all located on the unit circle. The rotation matrix can be represented as:

$$R(\theta) = \begin{bmatrix} r_0 & 0 & \cdots & 0 \\ 0 & r_1 & \cdots & 0 \\ \vdots & \vdots & \ddots & \vdots \\ 0 & 0 & \cdots & r_{M-1} \end{bmatrix}. \quad (4)$$

In one exemplary rotation matrix for BPSK modulated signals, the first four diagonal elements of the rotation matrix from equation (4) may be given as:

$$[r_0\, r_1\, r_2\, r_3] = [1\, e^{j\pi/2}\, 1\, e^{-j\pi/2}], \quad (5)$$

and this pattern may be repeated every four elements for all other terms on the diagonal. The corresponding subcarrier manipulation may be given as follows:

$$S_0, S_1 e^{j\pi/2}, S_2, S_3 e^{-j\pi/2}, \ldots, \quad (6)$$

where $S_0, S_1, S_2, S_3, \ldots$ are the BPSK symbol outputs of the S/P converter 510 from FIG. 5.

In another exemplary rotation matrix for BPSK modulated signals, the first eight diagonal elements of the rotation matrix from equation (4) may be given as:

$$[r_0\, r_1\, \ldots\, r_7] = \\ [1\, e^{j\pi/2}\, e^{j2\pi/2}\, e^{j3\pi/2}\, 1\, e^{-j\pi/2}\, e^{-j2\pi/2}\, e^{-j3\pi/2}], \quad (7)$$

and this pattern may be repeated every eight elements for all other terms on the diagonal. The corresponding subcarrier manipulation may be given as follows:

$$S_0, S_1 e^{j\pi/2}, S_2 e^{j2\pi/2}, S_3 e^{j3\pi/2}, S_4, S_5 e^{-j\pi/2}, S_6 e^{-j2\pi/2}, \\ S_7 e^{-j3\pi/2}, \ldots, \quad (8)$$

where $S_0, S_1, S_2, S_3, S_4, S_5, S_6, S_7, \ldots$ are the BPSK symbol outputs of the S/P converter 510 from FIG. 5.

Figure 6A:
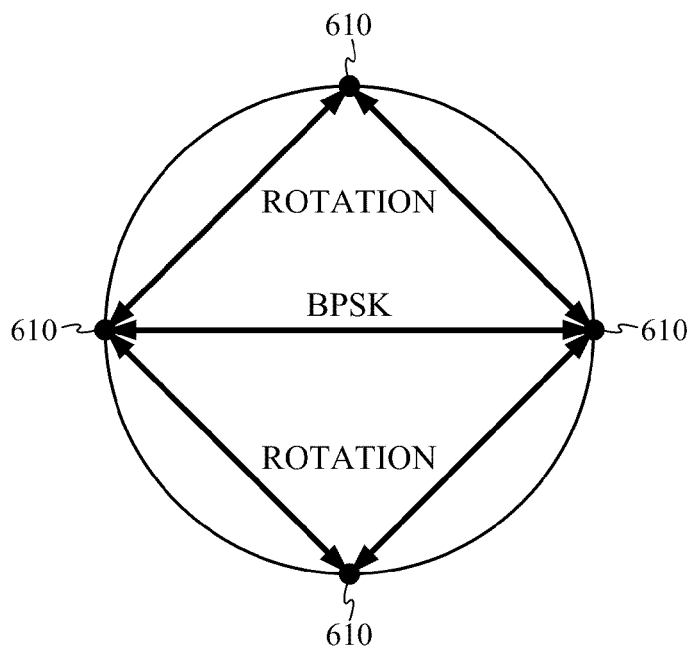
FIG. 6A illustrates phase constellations of original and phase-rotated Binary Phase Shift Keying (BPSK) signals in accordance with certain embodiments of the present disclosure.
Figure 7A:
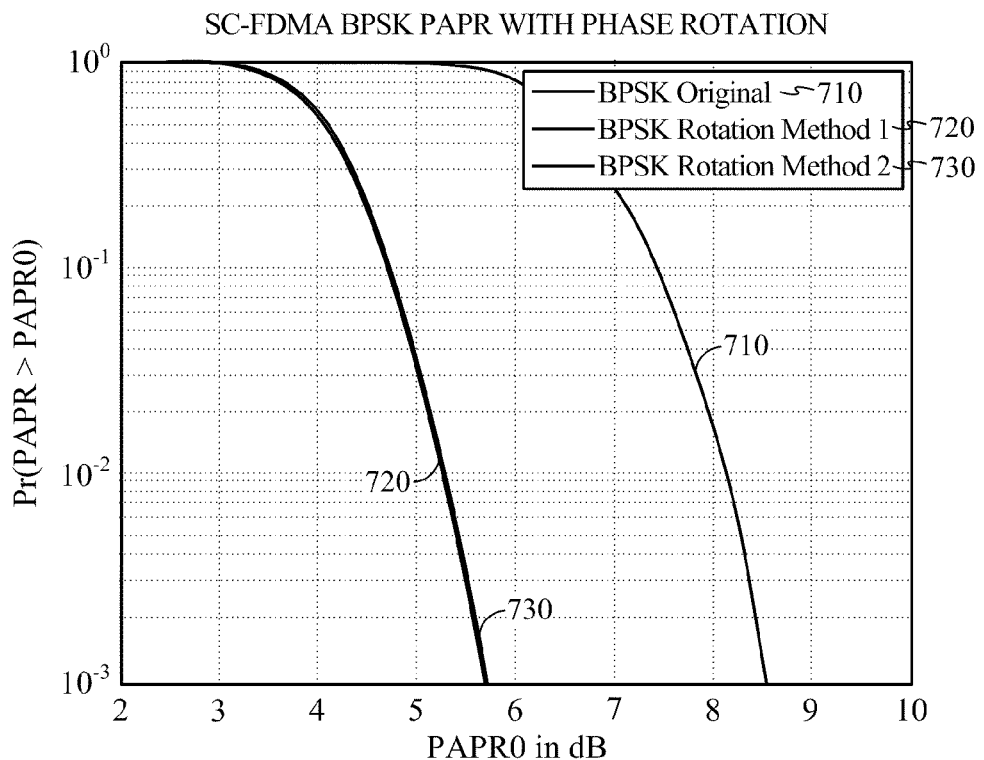
FIG. 7A illustrates a graph of example PAPR performance of original and phase-rotated BPSK signals in accordance with certain embodiments of the present disclosure.

FIG. 6A illustrates a resulting phase constellation 610 of the time-domain manipulated Binary Phase Shift Keying (BPSK) signal. FIG. 7A illustrates a graph of example PAPR performance of original and phase-rotated BPSK-modulated signals. It can be observed from FIG. 6A that while the conventional BPSK modulation has 180° phase transitions, the multiplication with $R(\theta)$ may restrict the phase transitions to only 90°. This technique may reduce the PAPR, as illustrated in FIG. 7A.

The complementary cumulative distribution function (CCDF) that is used to evaluate PAPR performance may be defined as:

$$CCDF = 1 - CDF, \quad (9)$$

where CDF represents the cumulative distribution function. The CCDF evaluated at a specified value $PAPR_0$ is related to the actual PAPR as follows:

$$CCDF(PAPR_0) = Pr\{PAPR > PAPR_0\}. \quad (10)$$

Thus the CCDF represents a probability (in %) that the actual PAPR is larger than the specified value $PAPR_0$. The PAPR values are typically measured in dB units.

Plot 710 in FIG. 7A represents the PAPR performance of the original SC-FDMA system illustrated in FIG. 3. Plots 720 and 730 represent the PAPR performance of the proposed phase-rotation scheme for rotation matrices $R(\theta)$ whose diagonal elements are defined by equation (5) and equation (7), respectively (labeled as "BPSK Rotation Method 1" and "BPSK Rotation Method 2" in FIG. 7A, respectively). It can be observed from FIG. 7A that the proposed phase-rotation technique may yield about 3 dB of PAPR reduction compared to the general SC-FDMA system for CCDF=0.1%.

The presented method for PAPR reduction based on rotation matrices may be also applied to Quadrature Phase Shift Keying (QPSK) and Quadrature Amplitude Modulation (QAM) signals. In one embodiment of the present disclosure, the following rotation matrix may be applied on QPSK-modulated signals:

$$R(\theta) = \begin{bmatrix} 1 & 0 & 0 & 0 & & & & \\ 0 & e^{j\pi/4} & 0 & 0 & & & & \\ 0 & 0 & 1 & 0 & & O & & \\ 0 & 0 & 0 & e^{j\pi/4} & & & & \\ & & & & \ddots & 0 & 0 & 0 \\ & & & & 0 & \cdots & 0 & 0 \\ & & O & & 0 & 0 & \ddots & 0 \\ & & & & 0 & 0 & 0 & \cdot \end{bmatrix}, \quad (11)$$

where, as in equation (5), the pattern on the main diagonal may repeat every four diagonal elements. Then, the corresponding subcarrier manipulation may be given as follows:

$$S_0, S_1 e^{j\pi/4}, S_2, S_3 e^{-j\pi/4}, \ldots, \quad (12)$$

where $S_0, S_1, S_2, S_3, \ldots$ are the QPSK symbol outputs of the S/P converter 510 from FIG. 5.

In yet another embodiment of the present disclosure, the following rotation matrix may be applied on QPSK signals:

$$R(\theta) = \begin{bmatrix} R_1(\theta) & 0 & \cdots & 0 & 0 \\ 0 & R_2(\theta) & \ddots & 0 & 0 \\ \vdots & \ddots & \ddots & \ddots & \vdots \\ 0 & 0 & \ddots & R_1(\theta) & 0 \\ 0 & 0 & \cdots & 0 & R_2(\theta) \end{bmatrix}, \quad (13)$$

-continued $$R_1(\theta) = \begin{bmatrix} 1 & 0 & 0 & 0 & & & & \\ 0 & e^{j\pi/4} & 0 & 0 & & O & & \\ 0 & 0 & e^{j\pi 2/4} & 0 & & & & \\ 0 & 0 & 0 & e^{j\pi 3/4} & & & & \\ & & & & e^{j\pi 4/4} & 0 & 0 & 0 \\ & & & & 0 & e^{j\pi 5/4} & 0 & 0 \\ & O & & & 0 & 0 & e^{j\pi 6/4} & 0 \\ & & & & 0 & 0 & 0 & e^{j\pi 7/4} \end{bmatrix} \quad (14)$$

where $R_2(\theta) = R_1(\theta)^*$. The corresponding sub-carrier mappings may be given as:

$$S_0, S_1 e^{j\pi/4}, S_2 e^{j\pi 2/4}, S_3 e^{j\pi 3/4}, S_4 e^{j\pi 4/4}, S_5 e^{j\pi 5/4}, S_6 e^{j\pi 6/4},$$
$$S_7 e^{j\pi 7/4}, S_8, S_9 e^{-j\pi/4}, S_{10} e^{-j\pi 2/4}, S_{11} e^{-j\pi 3/4}, S_{12} e^{-j\pi 4/4},$$
$$S_{13} e^{-j\pi 5/4}, S_{14} e^{-j\pi 6/4}, S_{15} e^{-j\pi 7/4} \quad (15)$$

Figure 6B:
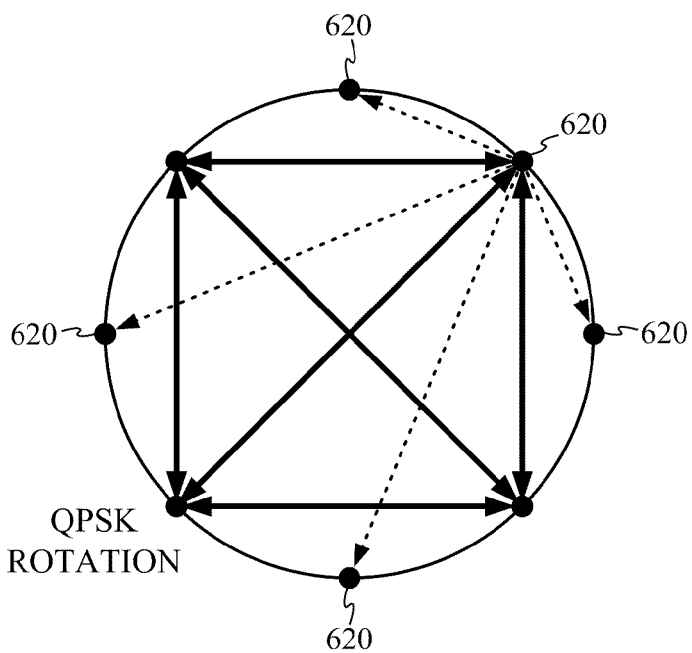
FIG. 6B illustrates phase constellations of original and phase-rotated Quadrature Phase Shift Keying (QPSK) signals in accordance with certain embodiments of the present disclosure.
Figure 7B:
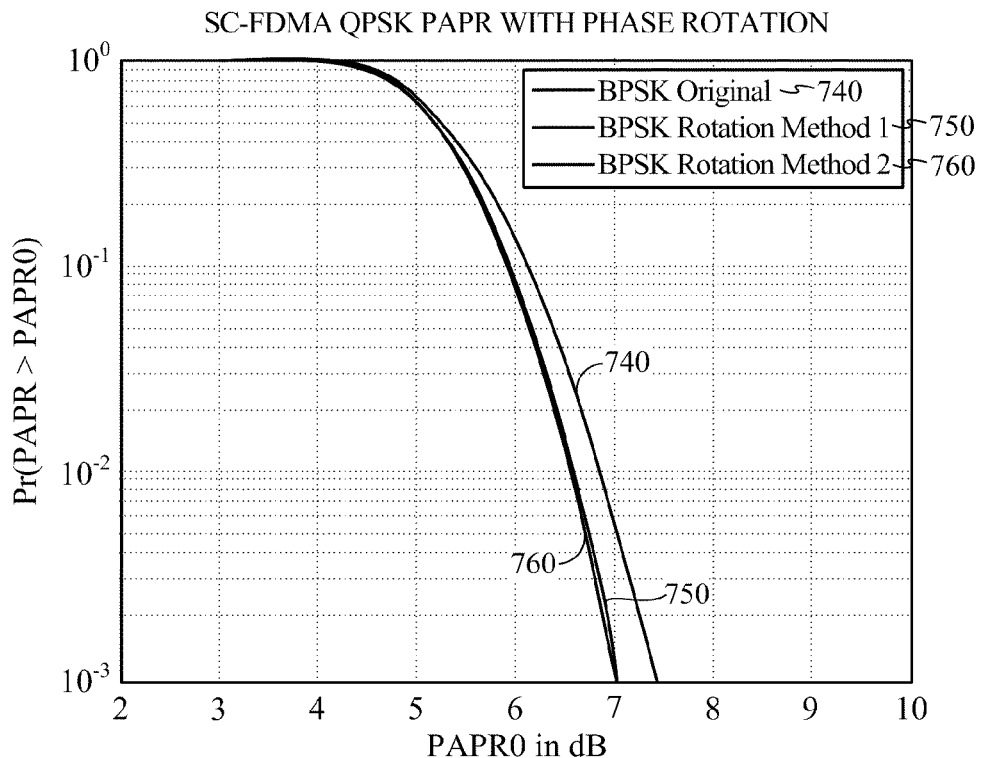
FIG. 7B illustrates a graph of example PAPR performance of original and phase-rotated QPSK signals in accordance with certain embodiments of the present disclosure.

FIG. 6B illustrates the resulting phase constellation 620 of the phase-rotated QPSK-modulated signal. FIG. 7B illustrates a graph of example PAPR performance of original and phase-rotated QPSK-modulated signals. It can be observed from FIG. 6B that while the conventional QPSK has 180° phase transitions, multiplication by $R(\theta)$ may restrict the transitions to only ±45° and ±135°. This may reduce the PAPR as illustrated in FIG. 7B.

Plot 740 in FIG. 7B represents the PAPR performance of the original SC-FDMA system illustrated in FIG. 3. Plots 750 and 760 represent the PAPR performance of the proposed phase-rotation scheme for rotation matrices $R(\theta)$ given by equation (11) and equations (13)-(14), respectively (labeled as "QPSK Rotation Method 1" and "QPSK Rotation Method 2" in FIG. 7B, respectively). It can be observed from FIG. 7B that the proposed phase-rotation technique may yield about 0.4 dB of PAPR reduction compared to the general SC-FDMA system for CCDF=0.1%.

Exemplary PAPR Reduction Based on Permutation of Frequency-Domain Samples

Figure 8:
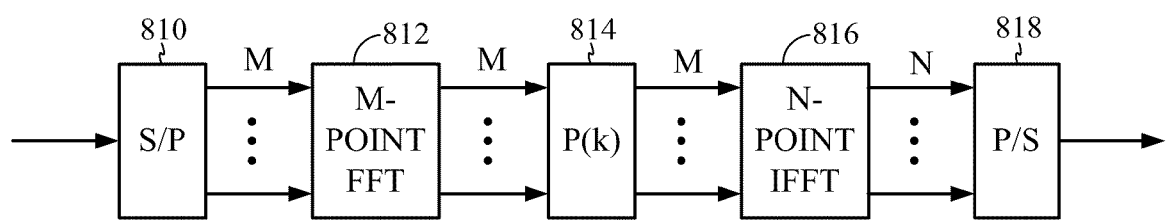
FIG. 8 illustrates an example block diagram of the SC-FDMA transmitter with a PAPR reduction scheme based on a frequency domain permutation in accordance with certain embodiments of the present disclosure.

For certain embodiments of the present disclosure, a level of PAPR may be reduced by permuting frequency-domain data samples. FIG. 8 illustrates an example block diagram of an SC-FDMA transmitter with a PAPR reduction scheme based on a frequency domain permutation. Time-domain complex input data may be first converted from a serial stream into a parallel stream in blocks of M symbols by a serial-to-parallel (S/P) converter 810, and then transformed to a frequency domain by the M-point FFT unit 812. The M parallel outputs from the FFT unit 812 may be multiplied by unit 814 with a permutation matrix P(k) of size M×M. Permuted parallel frequency-domain data samples may be converted back in time-domain by applying the N-point IFFT operation performed by unit 816. The N parallel outputs of the N-point IFFT unit 816 may be converted to a serial stream by a parallel-to-serial (P/S) converter 818 yielding a complex baseband signal to which a cyclic prefix (CP) may be appended, and then translated to a radio frequency (RF) band for transmission.

Although a very large number of permutation matrices (e.g., M!) permutation matrices) are possible, a restricted class of permutation matrices that correspond to simple circular shifts of the M parallel outputs of the FFT unit 812 may be considered. Therefore, the permutation matrix P(k) may be given as:

$$P(k) = \begin{bmatrix} 0 & 0 & \cdots & 1 \\ 1 & 0 & \cdots & 0 \\ \vdots & \ddots & \ddots & \vdots \\ 0 & \cdots & 1 & 1 \end{bmatrix}^n, \quad (16)$$

which corresponds to a right circular shift by n positions.

Figure 9A:
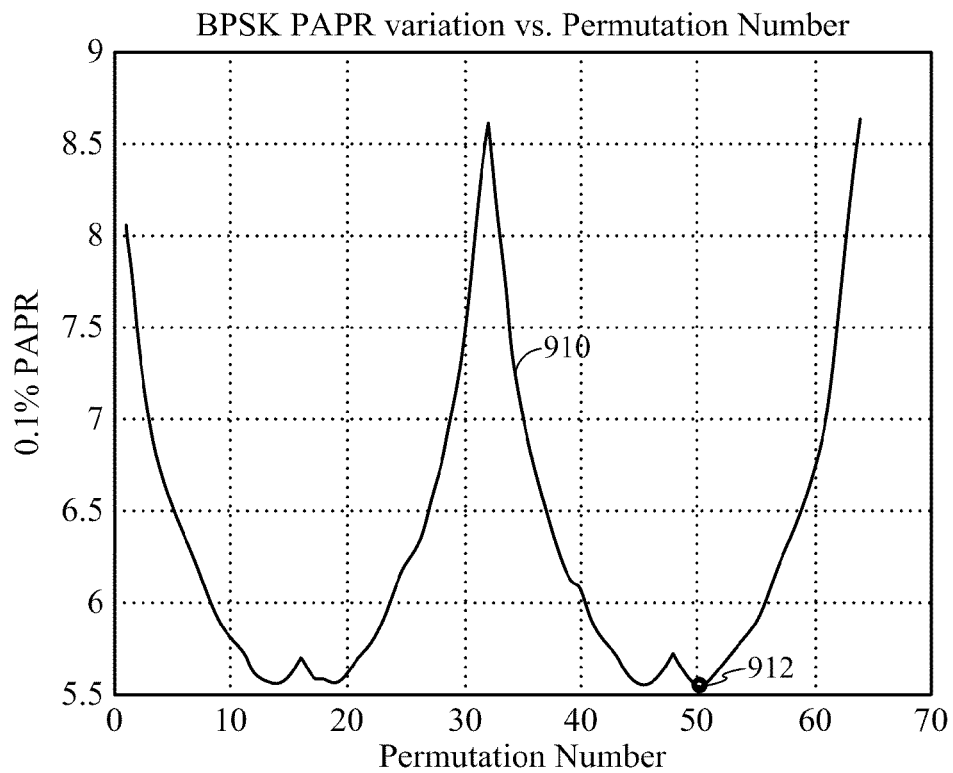
FIG. 9A illustrates a graph of example PAPR performance as a function of a permutation position of an applied permutation matrix for BPSK-modulated signals in accordance with certain embodiments of the present disclosure.
Figure 9B:
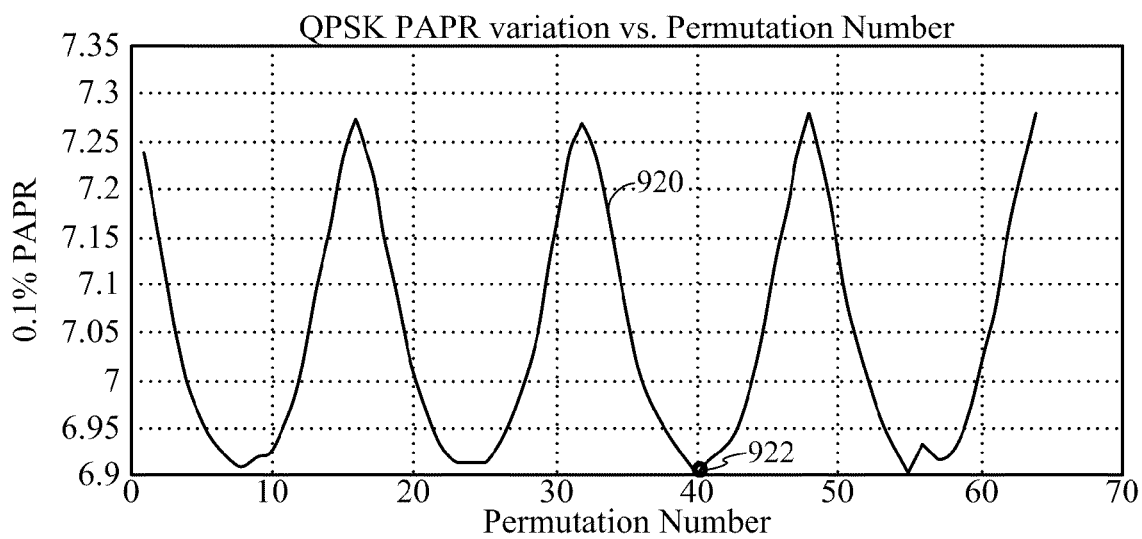
FIG. 9B illustrates a graph of example PAPR performance as a function of a permutation position of an applied permutation matrix for QPSK-modulated signals in accordance with certain embodiments of the present disclosure.
Figure 9C:
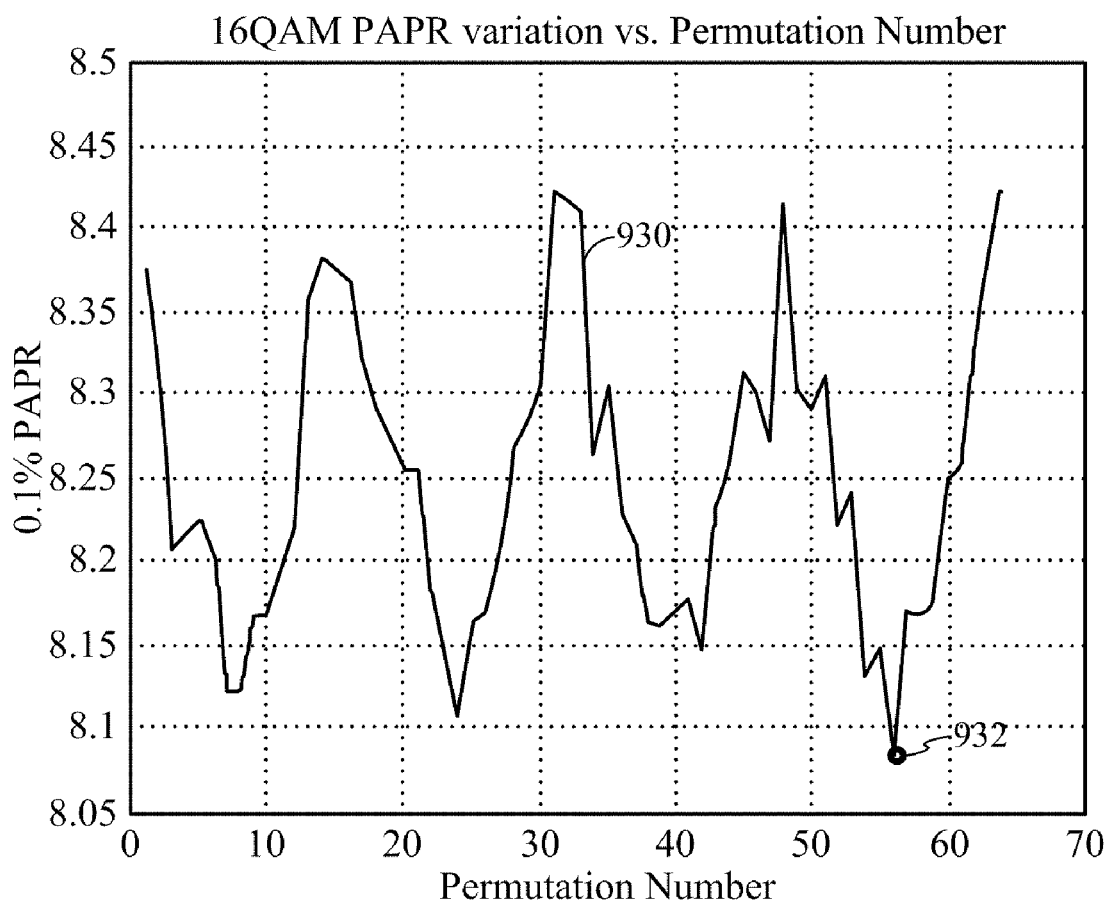
FIG. 9C illustrates a graph of example PAPR performance as a function of a permutation position of an applied permutation matrix for 16-QAM-modulated signals in accordance with certain embodiments of the present disclosure.

FIGS. 9A-9C illustrate variations of the PAPR values for CCDF=0.1% as a function of the permutation number n from equation (16) for BPSK, QPSK and 16-QAM signals, respectively. Based on these results, it can be possible to select the appropriate permutation for obtaining desired levels of PAPR. As an example, for BPSK signals, n=50 may yield the lowest PAPR (see the point 912 on plot 910 in FIG. 9A), while n=40 and n=56 may be preferred for QPSK and 16-QAM signals, respectively (see the point 922 on plot 920 in FIG. 9B, and the point 932 on plot 930 in FIG. 9C, respectively).

Figure 10:
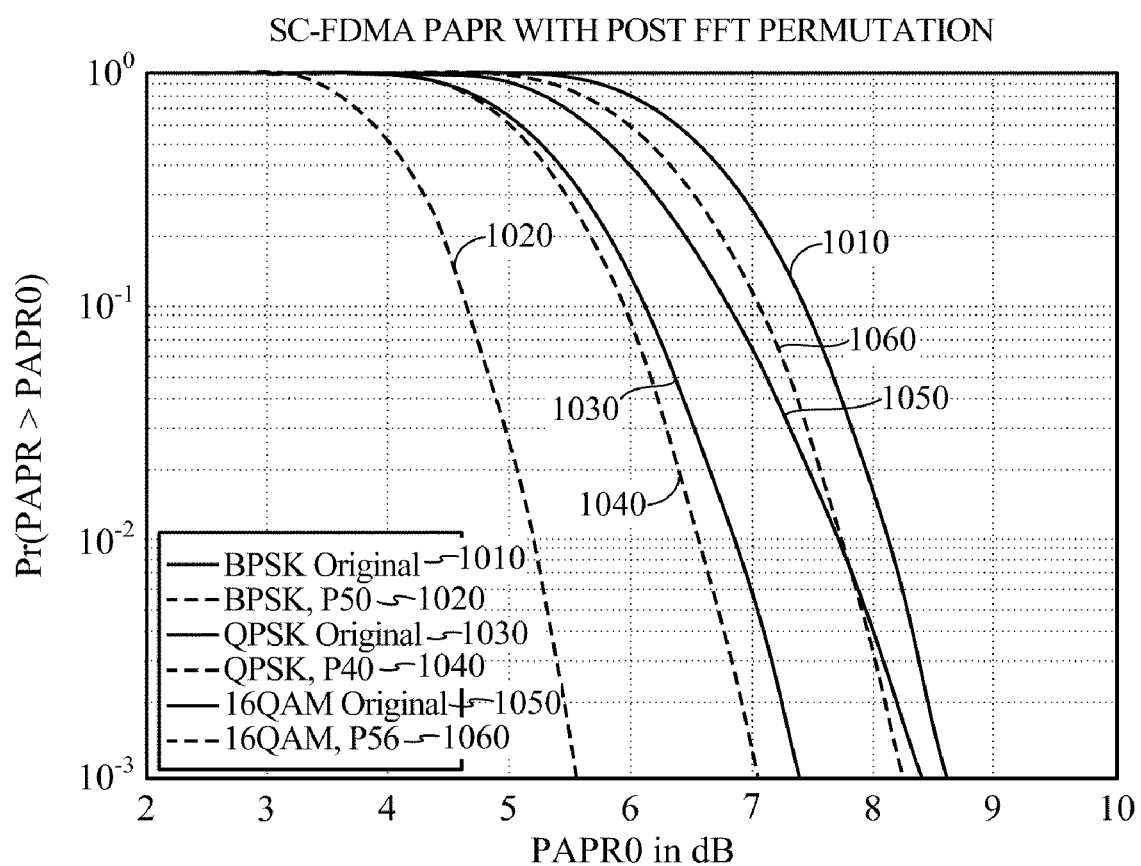
FIG. 10 illustrates a graph of example PAPR performance of BPSK, QPSK and 16-QAM signals when preferred frequency-domain permutations are applied in accordance with certain embodiments of the present disclosure.

FIG. 10 illustrates a graph of example PAPR performance of BPSK, QPSK and 16-QAM modulations using the preferred frequency-domain permutations. Plots 1010, 1030 and 1050 represent PAPR performance if no permutation is performed for BPSK, QPSK and 16-QAM signals, respectively. Plot 1020 represents PAPR performance if the permutation matrix from equation (16) cyclically shifted by 50 positions on the right is applied to BPSK-modulated signals, plot 1040 represents PAPR performance if the permutation matrix from equation (16) cyclically shifted by 40 positions on the right is applied to QPSK-modulated signals, and plot 1060 represents PAPR performance if the permutation matrix from equation (16) cyclically shifted by 56 positions on the right is applied to 16-QAM-modulated signals. It can be observed a PAPR performance improvement for all modulation schemes, especially for BPSK-modulated signals. The proposed technique may yield about 3 dB of PAPR reduction for BPSK-modulated signals for CCDF=0.1%, and about 0.4 dB and 0.1 dB of PAPR reduction for QPSK-modulated signals and 16-QAM-modulated signals for CCDF=0.1%, respectively.

The proposed technique for PAPR reduction based on the frequency-domain permutation, according to certain embodiments, may have several advantages. The permutation in frequency domain may be very simple to implement because no multipliers and adders are required. Furthermore, a preferred permutation position may be fixed for a given modulation type and for a given number of sub-carriers M, and does not depend on data. Furthermore, there is no need to convey side information to a receiver. Significant PAPR gain may be achieved for BPSK-modulated signals, while modest PAPR gain may be achieved for QPSK-modulated signals.

Exemplary PAPR Reduction using Bandwidth Expansion in Frequency Domain

Figure 11:
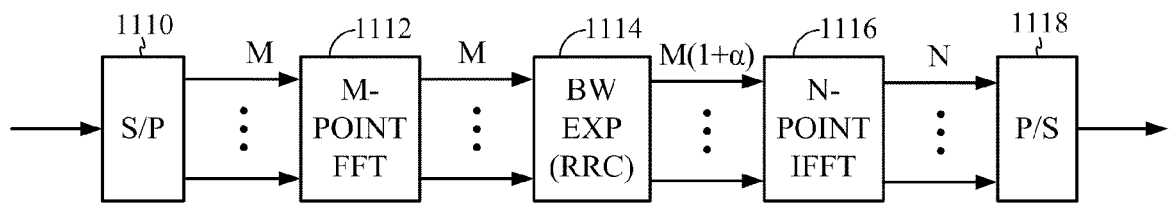
FIG. 11 illustrates an example block diagram of the SC-FDMA transmitter with a PAPR reduction scheme based on bandwidth expansion in frequency domain in accordance with certain embodiments of the present disclosure.

FIG. 11 illustrates an example block diagram of an SC-FDMA transmitter with a PAPR reduction scheme based on a bandwidth expansion in frequency domain. Time-domain complex input data may be first converted from a serial stream into a parallel stream in blocks of M symbols by a serial-to-parallel (S/P) converter 1110, and then transformed to a frequency domain by the M-point FFT unit 1112. The M parallel outputs from the FFT unit 1112 may be expanded to M·(1+α) samples and scaled by applying a Root-Raised-Cosine (RRC) filter, as denoted by the BW-EXP unit 1114. A parameter a denotes an increase in bandwidth: α=0 implies no increase in bandwidth, while α=1 implies a 100% increase in bandwidth.

Figure 12:
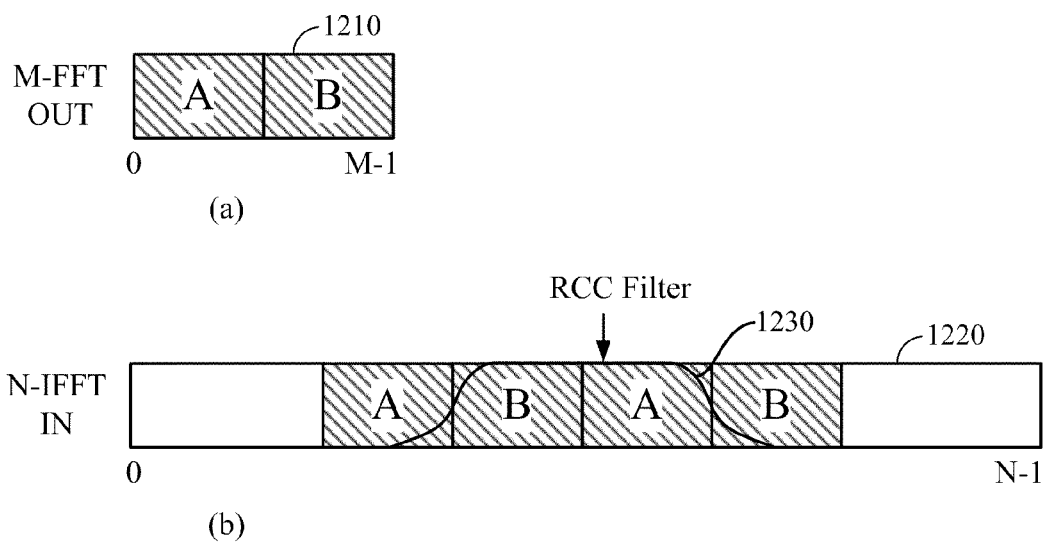
FIG. 12 illustrates the frequency-domain bandwidth expansion in accordance with certain embodiments of the present disclosure.

The mechanism of applying the RRC filter in the frequency domain is illustrated in FIG. 12. The output of the M-point FFT may be split into two (M/2)-point sequences A and B, as illustrated with a sequence 1210. If no bandwidth expansion is applied, sequences A and B would be connected to consecutive inputs of the N-point IFFT unit in the reverse order (i.e., the sequence A follows the sequence B), so that the DC carrier appears in the middle of the sequence 1210. However, in the case of bandwidth expansion, these two sequences may be repeated and weighted by the RRC filter 1230 before being connected to the inputs of the N-point IFFT unit, as illustrated with a sequence 1220.

Frequency-domain data samples with the expanded bandwidth may be converted back in time-domain by applying the N-point IFFT operation performed by unit 1116 illustrated in FIG. 11. The N parallel outputs of the N-point IFFT unit 1116 may be converted to a serial stream by a parallel-to-serial (P/S) converter 1118 yielding a complex baseband signal to which a cyclic prefix (CP) may be appended, and then translated to a radio frequency (RF) band for transmission.

Figure 13A:
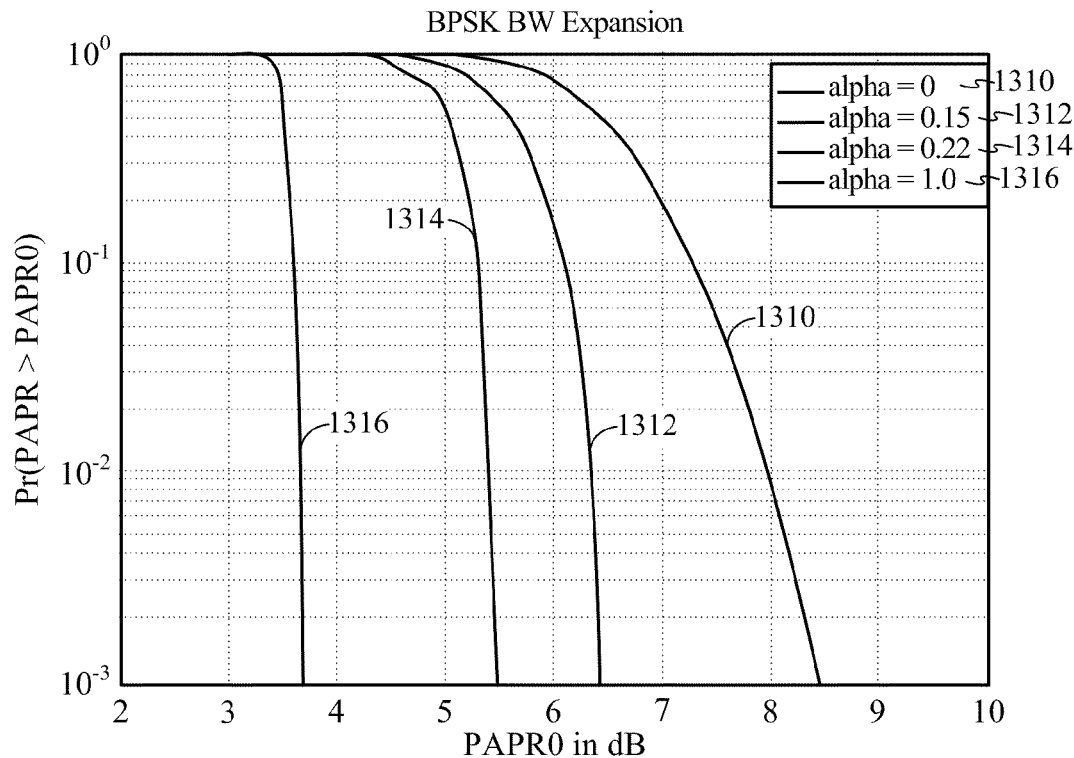
FIG. 13A illustrates a graph of example PAPR performance of BPSK signal when the frequency-domain bandwidth expansion is applied in accordance with certain embodiments of the present disclosure.
Figure 13B:
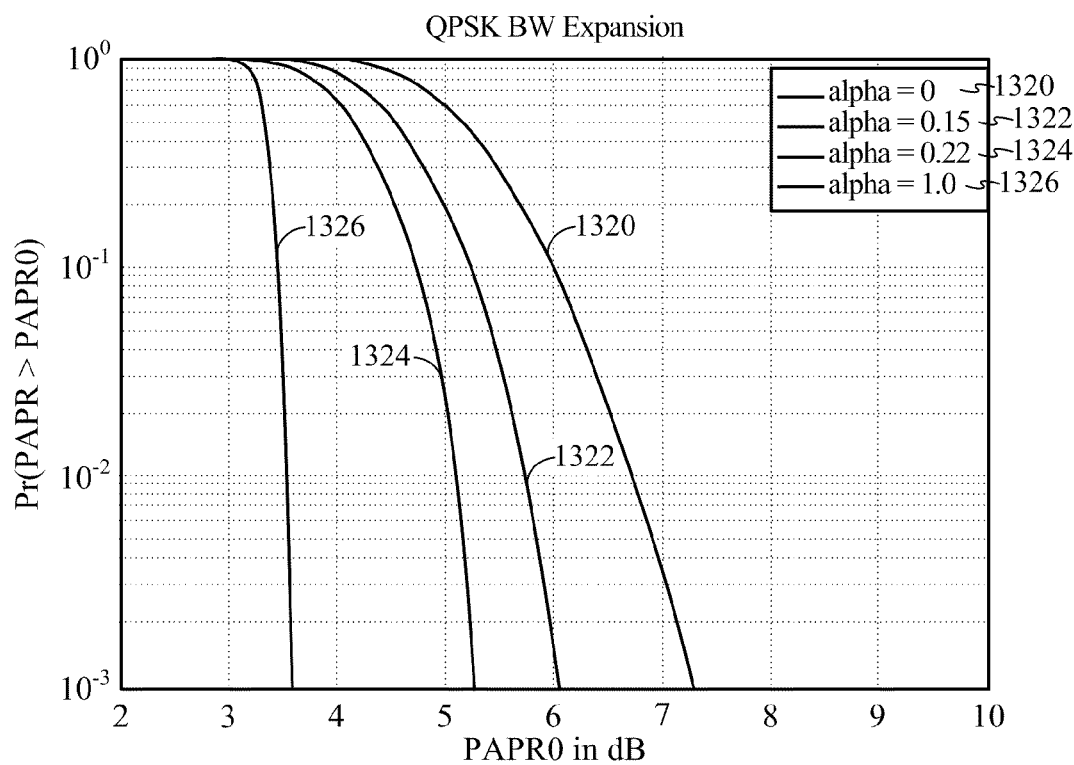
FIG. 13B illustrates a graph of example PAPR performance of QPSK signal when the frequency-domain bandwidth expansion is applied in accordance with certain embodiments of the present disclosure.
Figure 13C:
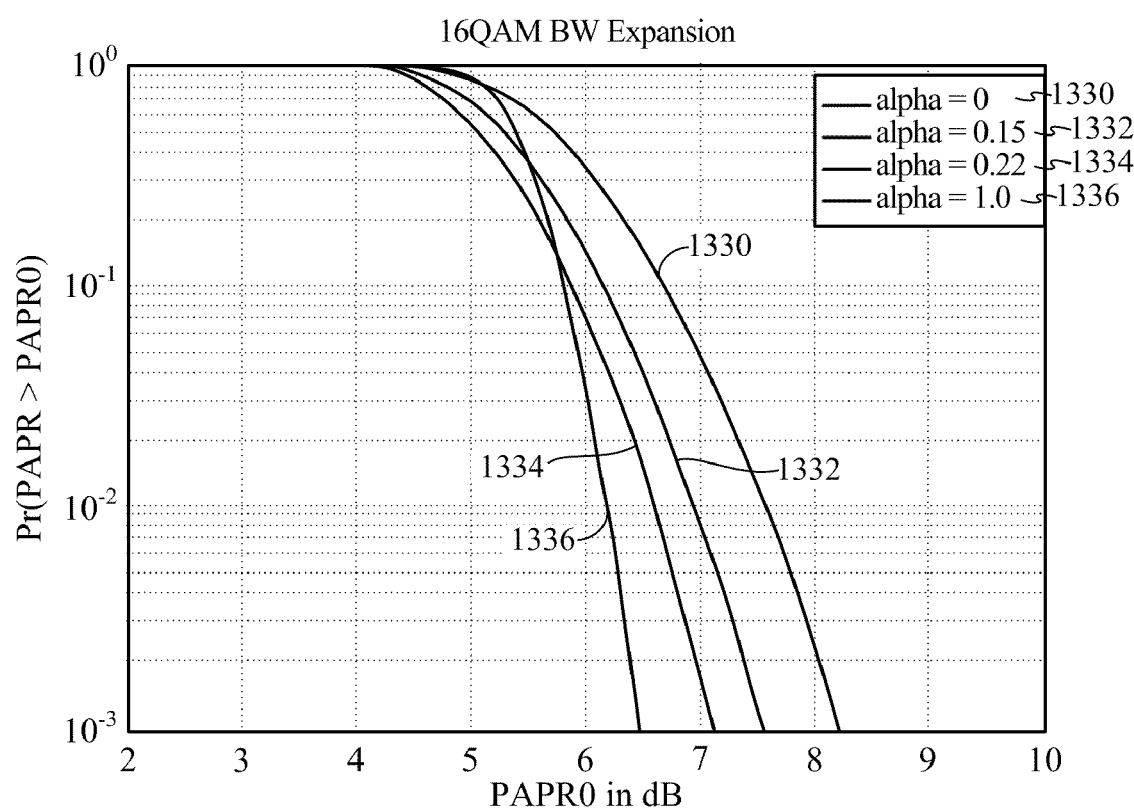
FIG. 13C illustrates a graph of example PAPR performance of 16-QAM signal when the frequency-domain bandwidth expansion is applied in accordance with certain embodiments of the present disclosure.

FIGS. 13A-13C illustrate the PAPR performance of BPSK, QPSK and 16-QAM signals, respectively when the bandwidth expansion technique is applied. The bandwidth expansion parameter $\alpha$ of 0 (i.e., no bandwidth expansion case), 0.15, 0.22 and 1 is considered. It can be observed from FIGS. 13A-13C that the bandwidth expansion method may yield substantial PAPR gains for BPSK-modulated signals, moderate PAPR gains for QPSK-modulated signals and modest PAPR gains for 16-QAM-modulated signals.

Exemplary Combined PAPR Reduction

Figure 14:
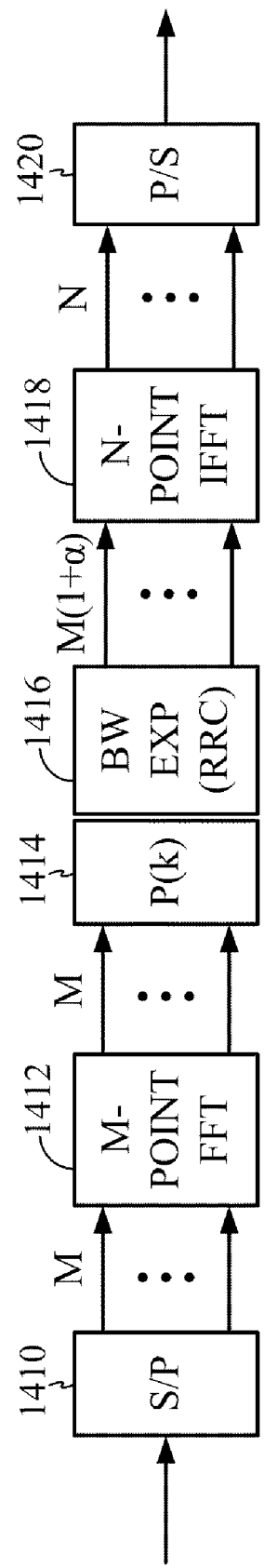
FIG. 14 illustrates an example block diagram of the SC-FDMA transmitter with a PAPR reduction scheme based on permutation and bandwidth expansion in frequency domain in accordance with certain embodiments of the present disclosure.

Certain embodiments of the present disclosure support combining of frequency-domain permutation and bandwidth expansion in order to achieve further reduction of the PAPR. FIG. 14 illustrates an example block diagram of an SC-FDMA transmitter with a PAPR reduction scheme based on permutation and bandwidth expansion in frequency domain.

Time-domain complex input data may be first converted from a serial stream to a parallel stream in blocks of M symbols by a serial-to-parallel (S/P) converter 1410, and then transformed to a frequency domain by the M-point FFT unit 1412. The M parallel outputs from the FFT unit 1412 may be first permuted by a permutation matrix P(k) in unit 1414. Permuted frequency-domain data samples may be then expanded to M·(1+$\alpha$) samples and scaled by applying a Root-Raised-Cosine (RRC) filter in the frequency domain, as denoted by the BW-EXP unit 1416. A parameter $\alpha$ may denote an increase in bandwidth: $\alpha$=0 implies no increase in bandwidth, while $\alpha$=1 implies a 100% increase in the bandwidth.

Permuted frequency-domain data samples with increased bandwidth may be converted back in time-domain by applying the N-point IFFT operation performed by unit 1418. The N parallel outputs of the N-point IFFT unit 1418 may be converted to a serial stream by a parallel-to-serial (P/S) converter 1420 yielding a complex baseband signal to which a cyclic prefix (CP) may be appended, and then translated to a radio frequency (RF) band for transmission.

Figure 15:
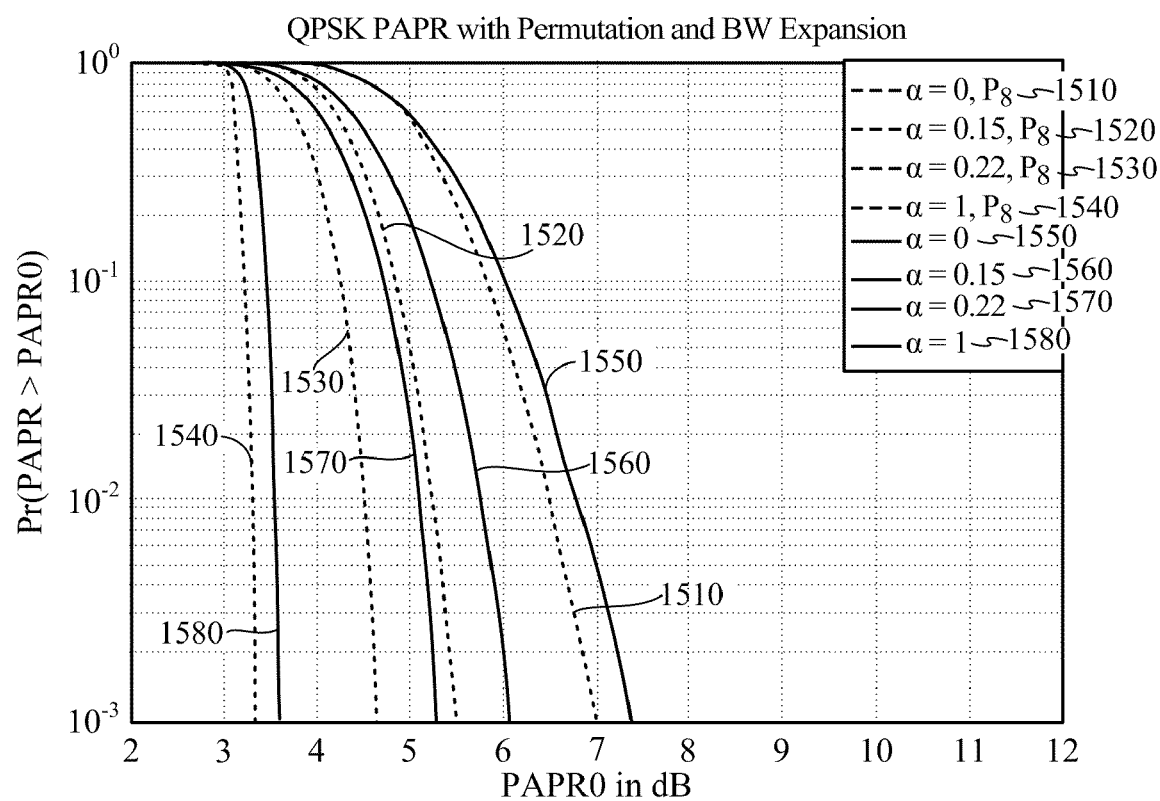
FIG. 15 illustrates a graph of example PAPR performance of QPSK signal when permutation and bandwidth expansion in frequency domain are applied in accordance with certain embodiments of the present disclosure.

FIG. 15 illustrates a graph of example PAPR performance of QPSK signal when permutation and bandwidth expansion are applied in frequency domain. The expansion parameter $\alpha$ equal to 0, 0.15, 0.22, and 1 is considered, while the permutation matrix defined in equation (16) cyclically shifted to the right by 8 positions may be also applied (labeled as $P_8$ in FIG. 15). It can be observed from FIG. 15 that substantial PAPR gains can be achieved if both frequency-domain permutation and bandwidth expansion are applied at the SC-FDMA transmitter.

Figure 16:
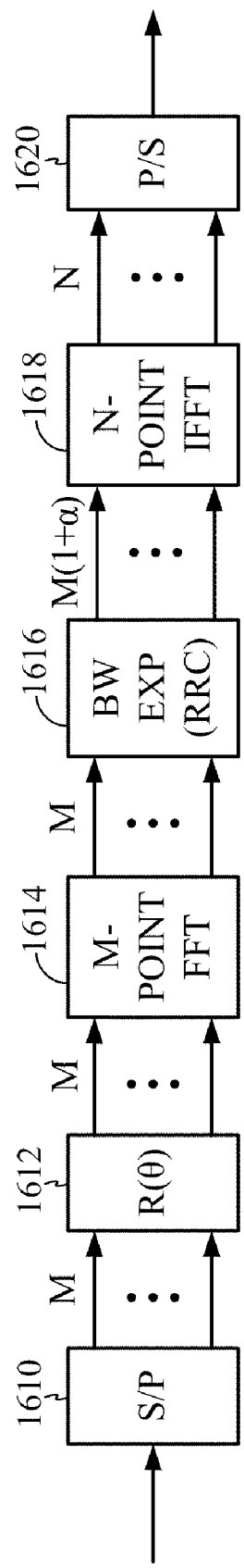
FIG. 16 illustrates an example block diagram of the SC-FDMA transmitter with a PAPR reduction scheme based on time-domain rotation and frequency-domain bandwidth expansion in accordance with certain embodiments of the present disclosure.

Certain embodiments of the present disclosure support combining of time-domain phase rotation with bandwidth expansion in frequency domain in order to achieve PAPR gains. FIG. 16 illustrates an example block diagram of the SC-FDMA transmitter with a PAPR reduction scheme based on time-domain rotation and frequency-domain bandwidth expansion.

Time-domain complex input data may be first converted from a serial stream to a parallel stream in blocks of M symbols by a serial-to-parallel (S/P) converter 1610. After that, phases of parallel time-domain data samples may be rotated by applying a rotation matrix R($\theta$) within unit 1612. The rotation matrix R($\theta$) may be defined as in equations (4), (5), (7), (11) and (13)-(14).

Parallel time-domain data samples with rotated phases may be then transformed to a frequency domain by the M-point FFT unit 1614. The M parallel outputs from the FFT unit 2614 may be expanded to M·(1+$\alpha$) samples and scaled by applying the RRC filter in frequency domain, as denoted by the BW-EXP unit 1616. A parameter $\alpha$ may denote an increase in bandwidth: $\alpha$=0 implies no increase in bandwidth, while $\alpha$=1 implies 100% increase in bandwidth.

Frequency-domain data samples with increased bandwidth may be then converted back in time-domain by applying the N-point IFFT operation performed by unit 1618. The N parallel outputs of the N-point IFFT unit 1618 may be converted to a serial stream by a parallel-to-serial (P/S) converter 1620 yielding a complex baseband signal to which a cyclic prefix (CP) may be appended, and then translated to a radio frequency (RF) band for transmission.

Figure 17:
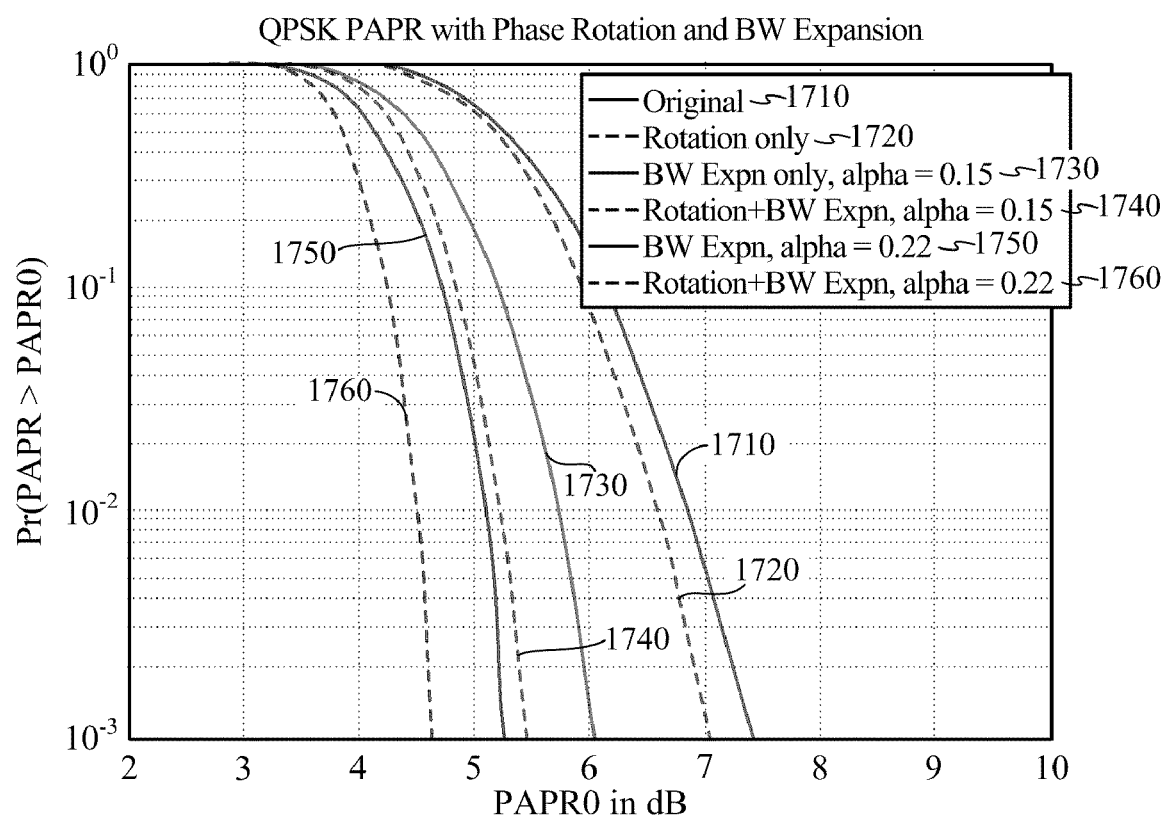
FIG. 17 illustrates a graph of example PAPR performance of QPSK signal when time-domain phase rotation and bandwidth expansion in frequency domain are applied in accordance with certain embodiments of the present disclosure.

FIG. 17 illustrates a graph of example PAPR performance of QPSK-modulated signal when time-domain phase rotation and bandwidth expansion in frequency domain are applied. Plot 1710 represents the generic SC-FDMA transmission from FIG. 3. Plot 1720 represents the case when only the time-domain phase rotation is applied, and plots 1730 and 1750 represent cases when only bandwidth expansion is applied in the frequency domain with the expansion parameter $\alpha$ of 0.15 and 0.22, respectively. It can be observed that PAPR gain is larger if the bandwidth is expanded by greater percentage. Plots 1740 and 1760 represent cases when both the time-domain phase rotation and bandwidth expansion are applied for the expansion parameter $\alpha$ of 0.15 and 0.22, respectively. It can be observed that the largest PAPR gain may be achieved in the case when phase rotation in time domain is combined with the bandwidth expansion of 22% (i.e., plot 1760).

Exemplary Continuous Phase Modulcation for PAPR Reduction

Figure 18:
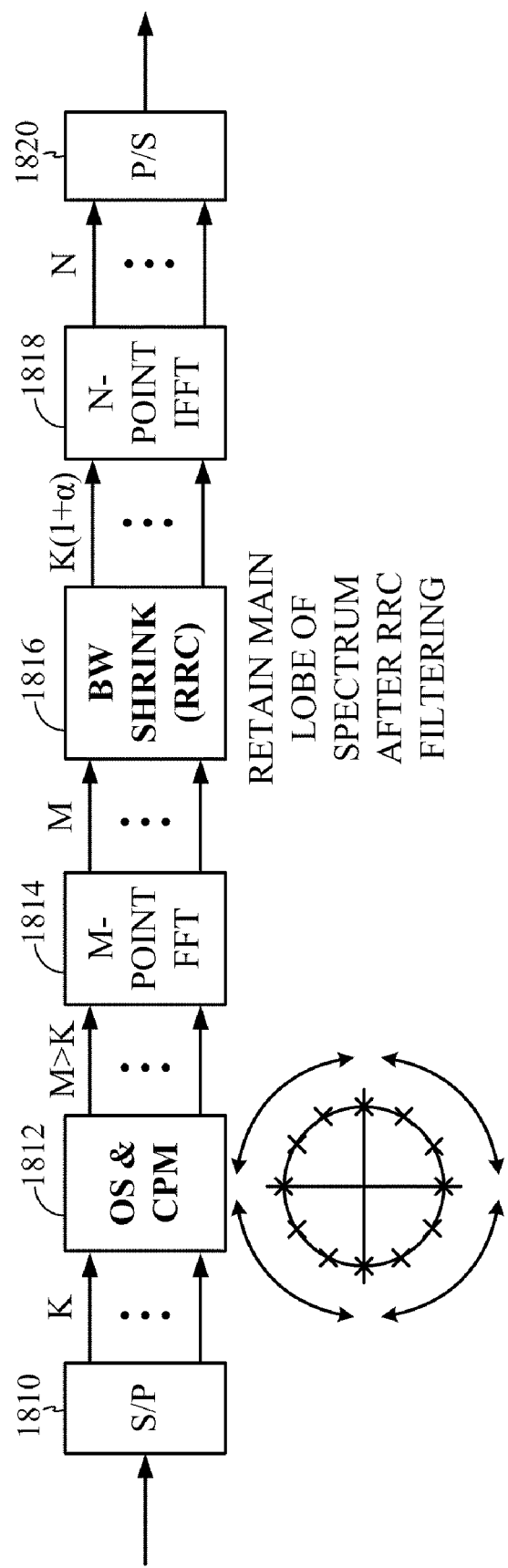
FIG. 18 illustrates an example block diagram of the SC-FDMA transmitter with a PAPR reduction scheme based on a continuous phase modulation (CPM) method combined with a bandwidth shrinking in accordance with certain embodiments of the present disclosure.

Certain embodiments of the present disclosure support the use of a Continuous Phase Modulation (CPM) technique at an SC-FDMA transmitter combined with a frequency domain bandwidth shrinking scheme to improve PAPR performance, as illustrated in FIG. 18.

The K data points from the S/P converter 1810 may be oversampled (OS) and modulated using the CPM technique by unit 1812 to yield M time domain points, where M>K. It can be assumed an exemplary case with a QPSK-modulated signal and an oversampling factor of four. In this case, the OS and the CPM functions may insert three interpolated complex samples between every pair of original input complex data points. For example, if the first input constellation point is $e^{j0}$, which is simply 1+j0, and the next constellation point is $e^{j\pi/2}$, which is simply 0+j1, then three new data points $e^{j\pi/8}$, $e^{j\pi/4}$ and $e^{j3\pi/8}$ may be inserted between two original constellation points in order to bridge a large phase shift with finer phase steps.

This exemplary approach may reduce the PAPR, but it may also increase the number of samples by the factor of four (M=4·K in this exemplary case). Because of that, it can be proposed to shrink the number of points entering the N-point IFFT unit 1818 by retaining only the main lobe of the spectrum at the output of the M-point FFT unit 1814, as illustrated in FIG. 18 by the BW Shrink unit 1816.

As an additional level of flexibility, $K·(1+\alpha)$ samples may be retained at the output of the M-point FFT unit 1814, instead of just K points, where a parameter $\alpha=0$ implies no increase and $\alpha=1$ implies 100% increase in the number of retained samples. If $\alpha>0$, a frequency domain RRC filtering of the main lobe may also be applied by unit 1816 to further improve the PAPR. The N parallel outputs of the N-point IFFT unit 1818 may be converted into a serial stream by a parallel-to-serial (P/S) converter 1820 yielding a complex baseband signal to which a cyclic prefix (CP) may be appended, and then translated to a radio frequency (RF) band for transmission.

Figure 19A:
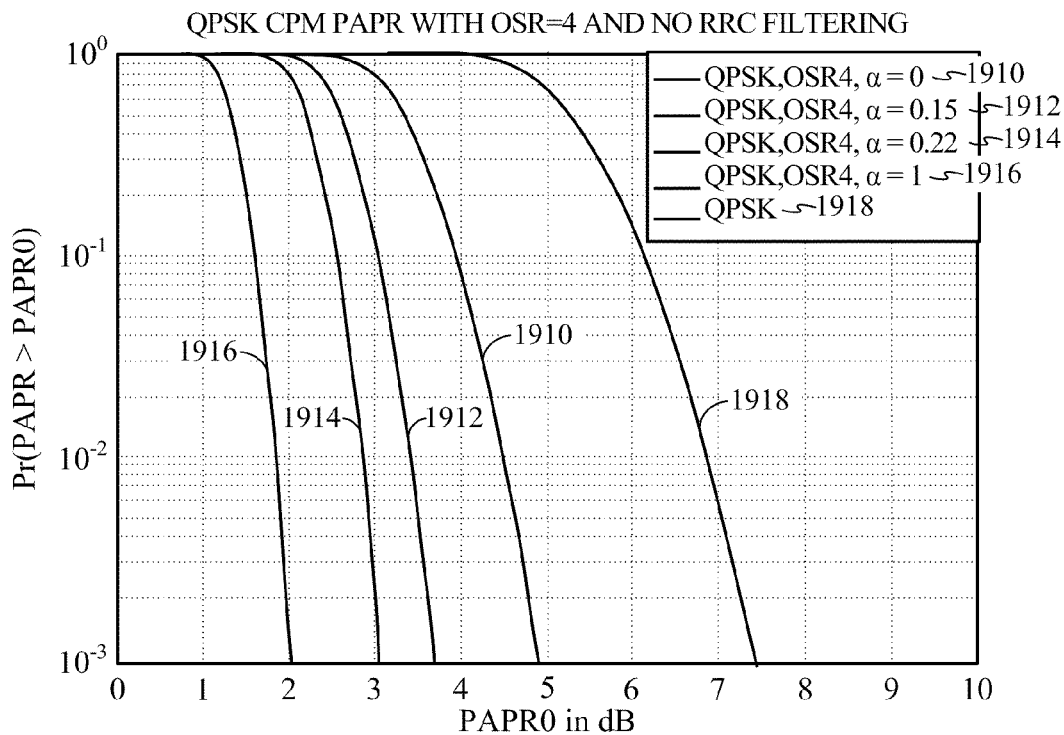
FIG. 19A illustrates a graph of example PAPR performance of QPSK signal when the CPM and the bandwidth shrinking without Root-Raised-Cosine (RRC) filtering are applied in accordance with certain embodiments of the present disclosure.
Figure 19B:
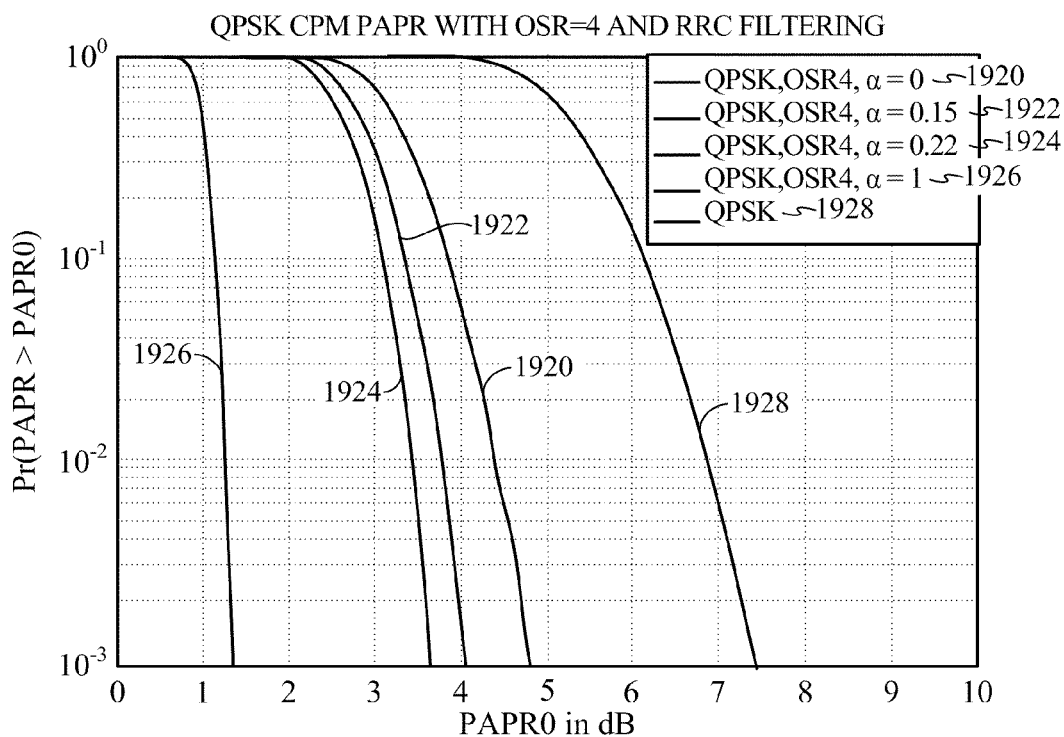
FIG. 19B illustrates a graph of example PAPR performance of QPSK signal when the CPM and the bandwidth shrinking with Root-Raised-Cosine (RRC) filtering are applied in accordance with certain embodiments of the present disclosure.

FIG. 19A illustrates a graph of example PAPR performance of QPSK-modulated signal when the CPM technique and the bandwidth shrinking without the RRC filtering are applied, and FIG. 19B illustrates a graph of example PAPR performance of QPSK signal when the CPM technique and the bandwidth shrinking along with the RRC filtering are applied. The oversampling ratio (OSR) is equal to four for all simulations illustrated in FIGS. 19A-19B, and the parameter $\alpha$ of 0, 0.15, 0.22 and 1 is considered. It can be observed the PAPR gain of about 5 dB for the CCDF of 0.1% compared to the conventional SC-FDMA transmission if the oversampling is combined with the bandwidth shrinking, where 2·K samples of the main lobe are retained and no RRC filtering is applied (i.e. plot 1916 vs. plot 1918 in FIG. 19A). The additional PAPR gain of about 1 dB (the total PAPR gain of about 6 dB) may be achieved if the RRC filtering is also applied (i.e., plot 1926 vs. plot 1928 in FIG. 19B).

Figure 4A:
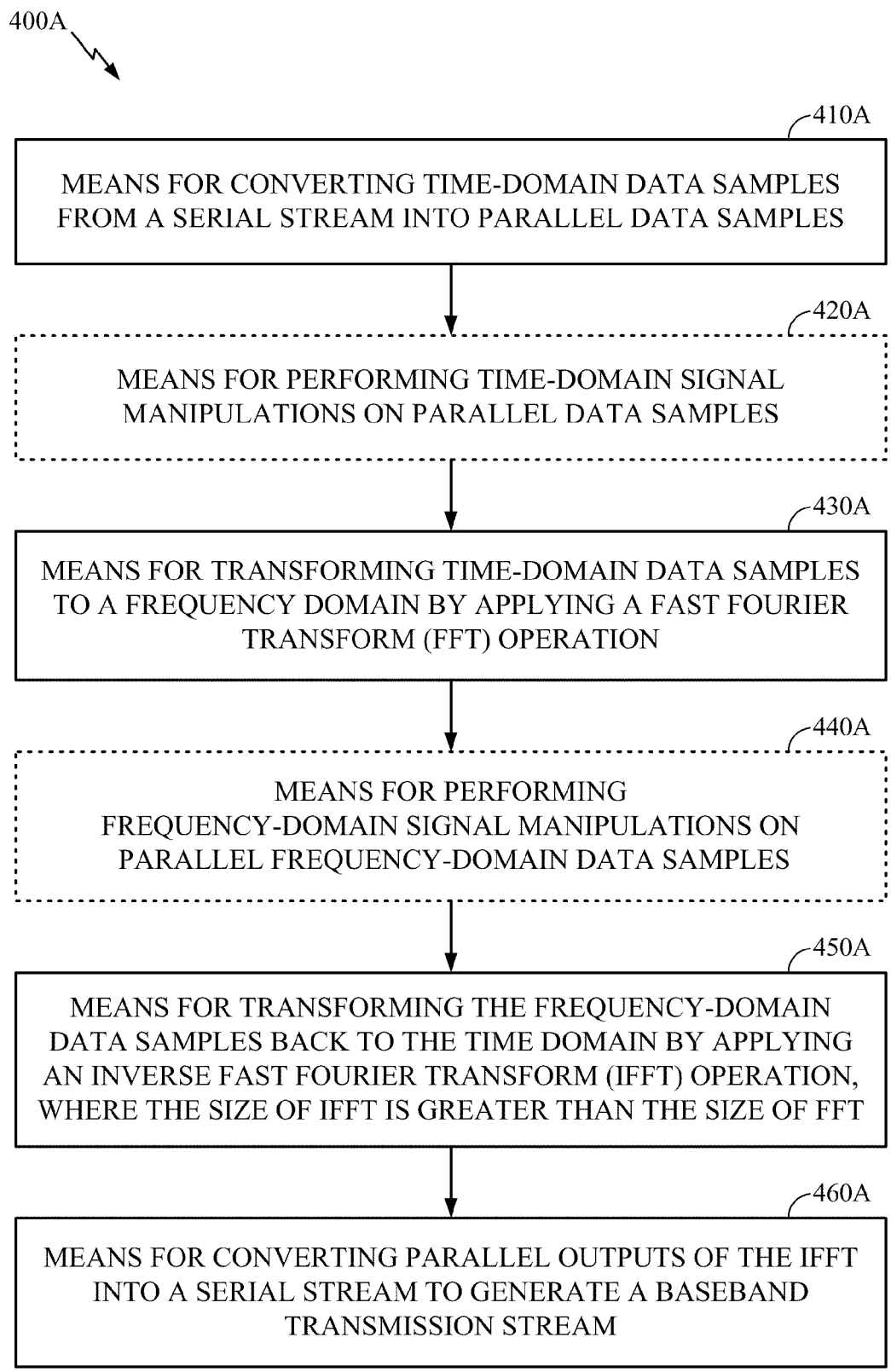
FIG. 4A illustrates example components capable of performing the operations illustrated in FIG. 4.

The various operations of methods described above may be performed by various hardware and/or software component(s) and/or module(s) corresponding to means-plus-function blocks illustrated in the Figures. For example, blocks 410-460 illustrated in FIG. 4 correspond to means-plus-function blocks 410A-460A illustrated in FIG. 4A. More generally, where there are methods illustrated in Figures having corresponding counterpart means-plus-function Figures, the operation blocks correspond to means-plus-function blocks with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A transmission method for a communication system using single carrier frequency division multiple access (SC-FDMA), the transmission method comprising:
  performing a serial-to-parallel conversion of modulated symbols of data to obtain a first sequence of samples;

performing a time-to-frequency transform on the first sequence of samples to obtain a second sequence of samples;

performing a frequency-domain manipulation of the second sequence of samples to obtain a third sequence of samples;

performing a frequency-to-time transform on the third sequence of samples to obtain a fourth sequence of samples, where a number of samples of the fourth sequence is greater than a number of samples of the second sequence;

performing a parallel-to-serial conversion of the fourth sequence of samples to obtain a fifth sequence of samples; and transmitting the fifth sequence of samples over a wireless channel, wherein performing the frequency-domain manipulation of the second sequence of samples to obtain the third sequence of samples comprises permuting samples of the second sequence, expanding a bandwidth of the permuted samples of the second sequence, and filtering permuted samples of the second sequence with the expanded bandwidth, and wherein a number of samples of the third sequence is greater than the number of samples of the second sequence.

2. The method of claim 1, wherein performing the transform on the first sequence of samples to obtain the second sequence of samples comprises performing a fast Fourier transform (FFT); and wherein performing the transform on the third sequence of samples to obtain the fourth sequence of samples comprises performing an inverse fast Fourier transform (IFFT).

3. The method of claim 1, wherein performing the frequency-domain manipulation of the second sequence of samples to obtain the third sequence of samples comprises permuting samples of the second sequence.

4. The method of claim 3, wherein permuting samples of the second sequence comprises right cyclic shifting of samples of the second sequence.

5. The method of claim 1, wherein filtering comprises a Root-Raised-Cosine (RRC) filtering.

6. A transmission method for a communication system using single earner frequency division multiple access (SC-FDMA), the transmission method comprising:

performing a serial-to-parallel conversion of modulated symbols of data to obtain a first sequence of samples;

performing a time-domain manipulation of the first sequence of samples to obtain a second sequence of samples;

performing a time-to-frequency transform on the second sequence of samples to obtain a third sequence of samples;

pertaining a frequency-domain manipulation of the third sequence of samples to obtain a fourth sequence of samples;

performing a frequency-to-time transform on the fourth sequence of samples to obtain a fifth sequence of samples, where a number of samples of the fifth sequence is greater than a number of samples of the third sequence;

performing a parallel-to-serial conversion of the fifth sequence of samples to obtain a sixth sequence of samples; and transmitting the sixth sequence of samples over a wireless channel, wherein performing the time-domain manipulation of the first sequence of samples to obtain the second sequence of samples comprises rotating phases of samples of the first sequence.

7. The method of claim 6, wherein performing the transform on the second sequence of samples to obtain the third sequence of samples comprises performing a fast Fourier transform (FFT); and wherein performing the transform on the fourth sequence of samples to obtain the fifth sequence of samples comprises performing an inverse fast Fourier transform (IFFT).

8. The method of claim 6, wherein performing the frequency-domain manipulation of the third sequence of samples to obtain the fourth sequence of samples comprises expanding a bandwidth of samples of the third sequence and filtering samples of the third sequence with the expanded bandwidth.

9. The method of claim 8, wherein a number of samples of the fourth sequence is greater than the number of samples of the third sequence.

10. The method of claim 8, wherein filtering comprises a Root-Raised-Cosine (RRC) filtering.

11. The method of claim 6, wherein performing the time-domain manipulation of the first sequence of samples to obtain the second sequence of samples comprises oversampling and continuous phase modulation of samples of the first sequence, and wherein performing the frequency-domain manipulation of the third sequence of samples to obtain the fourth sequence of samples comprises reducing a bandwidth of samples of the third sequence and filtering samples of the third sequence with the reduced bandwidth.

12. The method of claim 11, wherein a number of samples of the second sequence is greater than a number of samples of the first sequence, and wherein a number of samples of the fourth sequence is smaller than the number of samples of the third sequence.

13. The method of claim 11, wherein filtering comprises a Root-Raised-Cosine (RRC) filtering.

14. An apparatus for a communication system using single carrier frequency division multiple access (SC-FDMA), the apparatus comprising:

logic embodied in a processor for performing a serial-to-parallel conversion of modulated symbols of data to obtain a first sequence of samples;

logic embodied in a processor for performing a time-to-frequency transform on the first sequence of samples to obtain a second sequence of samples;

logic embodied in a processor for performing a frequency-domain manipulation of the second sequence of samples to obtain a third sequence of samples;

logic embodied in a processor for performing a frequency-to-time transform on the third sequence of samples to obtain a fourth sequence of samples, where a number of samples of the fourth sequence is greater than a number of samples of the second sequence;

logic embodied in a processor for performing a parallel-to-serial conversion of the fourth sequence of samples to obtain a fifth sequence of samples; and logic embodied in a processor for transmitting the fifth sequence of samples over a wireless channel, wherein the logic for performing the frequency-domain manipulation of the second sequence of samples to obtain the third sequence of samples comprises logic for permuting samples of the second sequence, logic for expanding a bandwidth of the permuted samples of the second sequence, and logic for filtering permuted samples of the second sequence with the expanded bandwidth, and wherein a number of samples of the third sequence is greater than the number of samples of the second sequence.

15. The apparatus of claim 14,
wherein the logic for performing the transform on the first sequence of samples to obtain the second sequence of samples comprises logic for performing a fast Fourier transform (FFT); and
wherein the logic for performing the transform on the third sequence of samples to obtain the fourth sequence of samples comprises logic for performing an inverse fast Fourier transform (1FFT).

16. The apparatus of claim 14, wherein the logic for performing the frequency-domain manipulation of the second sequence of samples to obtain the third sequence of samples comprises logic for permuting samples of the second sequence.

17. The apparatus of claim 16, wherein the logic for permuting samples of the second sequence comprises logic for right cyclic shifting of samples of the second sequence.

18. The apparatus of claim 14, wherein the logic for filtering comprises logic for Root-Raised-Cosine (RRC) filtering.

19. An apparatus for a communication system using single carrier frequency division multiple access (SC-FDMA), the apparatus comprising:
logic embodied in a processor for performing a serial-to-parallel conversion of modulated symbols of data to obtain a first sequence of samples;
logic embodied in a processor for performing a time-domain manipulation of the first sequence of samples to obtain a second sequence of samples;
logic embodied in a processor for performing a time-to-frequency transform on the second sequence of samples to obtain a third sequence of samples;
logic embodied in a processor for performing a frequency-domain manipulation of the third sequence of samples to obtain a fourth sequence of samples;
logic embodied in a processor for performing a frequency-to-time transform on the fourth sequence of samples to obtain a fifth sequence of samples, where a number of samples of the fifth sequence is greater than a number of samples of the third sequence;
logic embodied in a processor for performing a parallel-to-serial conversion of the fifth sequence of samples to obtain a sixth sequence of samples; and
logic embodied in a processor for transmitting the sixth sequence of samples over a wireless channel,
wherein the logic for performing the time-domain manipulation of the first sequence of samples to obtain the second sequence of samples comprises logic for rotating phases of samples of the first sequence.

20. The apparatus of claim 19,
wherein the logic for performing the transform on the second sequence of samples to obtain the third sequence of samples comprises logic for performing a fast Fourier transform (FFT); and
wherein the logic for performing the transform on the fourth sequence of samples to obtain the fifth sequence of samples comprises logic for performing an inverse fast Fourier transform (IFFT).

21. The apparatus of claim 19, wherein the logic for performing the frequency-domain manipulation of the third sequence of samples to obtain the fourth sequence of samples comprises logic for expanding a bandwidth of samples of the third sequence and logic for filtering samples of the third sequence with the expanded bandwidth.

22. The apparatus of claim 21, wherein a number of samples of the fourth sequence is greater than the number of samples of the third sequence.

23. The apparatus of claim 21, wherein the logic for filtering comprises logic for Root-Raised-Cosine (RRC) filtering.

24. The apparatus of claim 19, wherein the logic for performing the time-domain manipulation of the first sequence of samples to obtain the second sequence of samples comprises logic for oversampling and continuous phase modulation of samples of the first sequence, and wherein the logic for performing the frequency-domain manipulation of the third sequence of samples to obtain the fourth sequence of samples comprises logic for reducing a bandwidth of samples of the third sequence and logic for filtering samples of the third sequence with the reduced bandwidth.

25. The apparatus of claim 24, wherein a number of samples of the second sequence is greater than a number of samples of the first sequence, and wherein a number of samples of the fourth sequence is smaller than the number of samples of the third sequence.

26. The apparatus of claim 24, wherein the logic for filtering comprises logic for Root-Raised-Cosine (RRC) filtering.

27. An apparatus for a communication system using single earner frequency division multiple access (SC-FDMA), the apparatus comprising:
means for performing a serial-to-parallel conversion of modulated symbols of data to obtain a first sequence of samples;
means for performing a time-to-frequency transform on the first sequence of samples to obtain a second sequence of samples;
means for performing a frequency-domain manipulation of the second sequence of samples to obtain a third sequence of samples;
means for performing a frequency-to-time transform on the third sequence of samples to obtain a fourth sequence of samples, where a number of samples of the fourth sequence is greater than a number of samples of the second sequence;
means for performing a parallel-to-serial conversion of the fourth sequence of samples to obtain a fifth sequence of samples; and
means for transmitting the fifth sequence of samples over a wireless channel,
wherein the means for performing the frequency-domain manipulation of the second sequence of samples to obtain the third sequence of samples comprises means for permuting samples of the second sequence, means for expanding a bandwidth of the permuted samples of the second sequence, and means for filtering permuted samples of the second sequence with the expanded bandwidth, and wherein a number of samples of the third sequence is greater than the number of samples of the second sequence.

28. The apparatus of claim 27,
wherein the means for performing the transform on the first sequence of samples to obtain the second sequence of samples comprises means for performing a fast Fourier transform (FFT); and
wherein the means for performing the transform on the third sequence of samples to obtain the fourth sequence of samples comprises means for performing an inverse fast Fourier transform (1FFT).

29. The apparatus of claim 27, wherein the means for performing the frequency-domain manipulation of the second sequence of samples to obtain the third sequence of samples comprises means for permuting samples of the second sequence.

30. The apparatus of claim 29, wherein the means for permuting samples of the second sequence comprises means for right cyclic shifting of samples of the second sequence.

31. The apparatus of claim 27, wherein the means for filtering comprises means for Root-Raised-Cosine (RRC) filtering.

32. An apparatus for a communication system using single carrier frequency division multiple access (SC-FDMA), the apparatus comprising:
    means for performing a serial-to-parallel conversion of modulated symbols of data to obtain a first sequence of samples;
    means for performing a time-domain manipulation of the first sequence of samples to obtain a second sequence of samples;
    means for performing a time-to-frequency transform on the second sequence of samples to obtain a third sequence of samples;
    means for performing a frequency-domain manipulation of the third sequence of samples to obtain a fourth sequence of samples;
    means for performing a frequency-to-time transform on the fourth sequence of samples to obtain a fifth sequence of samples, where a number of samples of the fifth sequence is greater than a number of samples of the third sequence;
    means for performing a parallel-to-serial conversion of the fifth sequence of samples to obtain a sixth sequence of samples; and
    means for transmitting the sixth sequence of samples over a wireless channel,
    wherein the means for performing the time-domain manipulation of the first sequence of samples to obtain the second sequence of samples comprises means for rotating phases of samples of the first sequence.

33. The apparatus of claim 32,
    wherein the means for performing the transform on the second sequence of samples to obtain the third sequence of samples comprises means for performing a fast Fourier transform (FFT); and
    wherein the means for performing the transform on the fourth sequence of samples to obtain the fifth sequence of samples comprises means for performing an inverse fast Fourier transform (IFFT).

34. The apparatus of claim 32, wherein the means for performing the frequency-domain manipulation of the third sequence of samples to obtain the fourth sequence of samples comprises means for expanding a bandwidth of samples of the third sequence and means for filtering samples of the third sequence with the expanded bandwidth.

35. The apparatus of claim 34, wherein a number of samples of the fourth sequence is greater than the number of samples of the third sequence.

36. The apparatus of claim 34, wherein the means for filtering comprises means for Root-Raised-Cosine (RRC) filtering.

37. The apparatus of claim 32, wherein the means for performing the time-domain manipulation of the first sequence of samples to obtain the second sequence of samples comprises means for over sampling and continuous phase modulation of samples of the first sequence, and wherein the means for performing the frequency-domain manipulation of the third sequence of samples to obtain the fourth sequence of samples comprises means for reducing a bandwidth of samples of the third sequence and means for filtering samples of the third sequence with the reduced bandwidth.

38. The apparatus of claim 37, wherein a number of samples of the second sequence is greater than a number of samples of the first sequence, and wherein a number of samples of the fourth sequence is smaller than the number of samples of the third sequence.

39. The apparatus of claim 37, wherein the means for filtering comprises means for Root-Raised-Cosine (RRC) filtering.

40. A computer-program product for a communication system using single carrier frequency division multiple access (SC-FDMA), comprising a non-transitory computer-readable medium having instructions stored thereon, the instructions being executable by one or more processors and the instructions comprising:
    instructions for performing a serial-to-parallel conversion of modulated symbols of data to obtain a first sequence of samples;
    instructions for performing a time-to-frequency transform on the first sequence of samples to obtain a second sequence of samples;
    instructions for performing a frequency-domain manipulation of the second sequence of samples to obtain a third sequence of samples;
    instructions for performing a frequency-to-time transform on the third sequence of samples to obtain a fourth sequence of samples, where a number of samples of the fourth sequence is greater than a number of samples of the second sequence;
    instructions for performing a parallel-to-serial conversion of the fourth sequence of samples to obtain a fifth sequence of samples; and
    instructions for transmitting the fifth sequence of samples over a wireless channel,
    wherein the instructions for performing the frequency-domain manipulation of the second sequence of samples to obtain the third sequence of samples comprise instructions for permuting samples of the second sequence, instructions for expanding a bandwidth of the permuted samples of the second sequence, and instructions for filtering permuted samples of the second sequence with the expanded bandwidth, and wherein a number of samples of the third sequence is greater than the number of samples of the second sequence.

41. The computer-program product of claim 40,
    wherein the instructions for performing the transform on the first sequence of samples to obtain the second sequence of samples comprise instructions for performing a fast Fourier transform (FFT); and
    wherein the instructions for performing the transform on the third sequence of samples to obtain the fourth sequence of samples comprise instructions for performing an inverse fast Fourier transform (IFFT).

42. The computer-program product of claim 40, wherein the instructions for performing the frequency-domain manipulation of the second sequence of samples to obtain the third sequence of samples comprise instructions for permuting samples of the second sequence.

43. The computer-program product of claim 42, wherein the instructions for permuting samples of the second sequence comprise instructions for right cyclic shifting of samples of the second sequence.

44. The computer-program product of claim 40, wherein the instructions for filtering comprise instructions for Root-Raised-Cosine (RRC) filtering.

45. A computer-program product for a communication system using single carrier frequency division multiple access (SC-FDMA), comprising a non-transitory computer-readable medium having instructions stored thereon, the instructions being executable by one or more processors and the instructions comprising:
- instructions for performing a serial-to-parallel conversion of modulated symbols of data to obtain a first sequence of samples;
- instructions for performing a time-domain manipulation of the first sequence of samples to obtain a second sequence of samples;
- instructions for performing a time-to-frequency transform on the second sequence of samples to obtain a third sequence of samples;
- instructions for performing a frequency-domain manipulation of the third sequence of samples to obtain a fourth sequence of samples;
- instructions for performing a frequency-to-time transform on the fourth sequence of samples to obtain a fifth sequence of samples, where a number of samples of the fifth sequence is greater than a number of samples of the third sequence;
- instructions for performing a parallel-to-serial conversion of the fifth sequence of samples to obtain a sixth sequence of samples; and
- instructions for transmitting the sixth sequence of samples over a wireless channel,
- wherein the instructions for performing the time-domain manipulation of the first sequence of samples to obtain the second sequence of samples comprise instructions for rotating phases of samples of the first sequence.

46. The computer-program product of claim 45,
- wherein the instructions for performing the transform on the second sequence of samples to obtain the third sequence of samples comprise instructions for performing a fast Fourier transform (FFT); and
- wherein the instructions for performing the transform on the fourth sequence of samples to obtain the fifth sequence of samples comprise instructions for performing an inverse fast Fourier transform (IFFT).

47. The computer-program product of claim 45, wherein the instructions for performing the frequency-domain manipulation of the third sequence of samples to obtain the fourth sequence of samples comprise instructions for expanding a bandwidth of samples of the third sequence and instructions for filtering samples of the third sequence with the expanded bandwidth.

48. The computer-program product of claim 47, wherein a number of samples of the fourth sequence is greater than the number of samples of the third sequence.

49. The computer-program product of claim 47, wherein the instructions for filtering comprise instructions for Root-Raised-Cosine (RRC) filtering.

50. The computer-program product of claim 45, wherein the instructions for performing the time-domain manipulation of the first sequence of samples to obtain the second sequence of samples comprise instructions for oversampling and continuous phase modulation of samples of the first sequence, and wherein the instructions for performing the frequency-domain manipulation of the third sequence of samples to obtain the fourth sequence of samples comprise instructions for reducing a bandwidth of samples of the third sequence and instructions for filtering samples of the third sequence with the reduced bandwidth.

51. The computer-program product of claim 50, wherein a number of samples of the second sequence is greater than a number of samples of the first sequence, and wherein a number of samples of the fourth sequence is smaller than the number of samples of the third sequence.

52. The computer-program product of claim 50, wherein the instructions for filtering comprise instructions for Root-Raised-Cosine (RRC) filtering.

* * * * *